United States Patent
Walther et al.

(10) Patent No.: US 9,840,635 B2
(45) Date of Patent: Dec. 12, 2017

(54) BINDING AGENT SYSTEMS

(71) Applicant: Construction Research & Technology, GmbH, Trostberg (DE)

(72) Inventors: Burkhard Walther, Taching am See (DE); Bernhard Feichtenschlager, Traunstein (DE); Heimo Woelfle, Traunstein (DE); Bernd Bruchmann, Freinsheim (DE); Alfons Smeets, Seebruck (DE)

(73) Assignee: Construction Research & Technology, GmbH, Trostberg (DE)

( * ) Notice: Subject to any disclaimer, the term of this patent is extended or adjusted under 35 U.S.C. 154(b) by 0 days.

(21) Appl. No.: 15/033,768

(22) PCT Filed: Oct. 23, 2014

(86) PCT No.: PCT/EP2014/072726
§ 371 (c)(1),
(2) Date: May 2, 2016

(87) PCT Pub. No.: WO2015/067478
PCT Pub. Date: May 14, 2015

(65) Prior Publication Data
US 2016/0280954 A1   Sep. 29, 2016

(30) Foreign Application Priority Data

Nov. 5, 2013  (EP) ..................................... 13191636

(51) Int. Cl.
| C09D 133/14 | (2006.01) |
| C09D 4/00 | (2006.01) |
| C09J 4/00 | (2006.01) |
| C09J 133/14 | (2006.01) |
| C08F 222/10 | (2006.01) |

(52) U.S. Cl.
CPC .............. *C09D 133/14* (2013.01); *C09D 4/00* (2013.01); *C09J 4/00* (2013.01); *C09J 133/14* (2013.01); *C08F 222/1006* (2013.01)

(58) Field of Classification Search
CPC .................................................. C09D 133/14
See application file for complete search history.

(56) References Cited

U.S. PATENT DOCUMENTS

| 4,298,738 A | 11/1981 | Lechtken et al. |
| 5,380,901 A | 1/1995 | Antonucci et al. |
| 5,459,173 A | 10/1995 | Glaser et al. |
| 5,534,559 A | 7/1996 | Leppard et al. |
| 6,353,141 B1 | 3/2002 | Zeller et al. |
| 6,551,710 B1 | 4/2003 | Chen et al. |
| 6,562,464 B1 | 5/2003 | Schwalm et al. |
| 7,105,206 B1 | 9/2006 | Beck et al. |
| 2007/0135556 A1 | 6/2007 | Schwalm et al. |
| 2012/0129971 A1 | 5/2012 | Klok et al. |

FOREIGN PATENT DOCUMENTS

| CA | 2059145 A1 | 1/1992 |
| CN | 1651533 A | 8/2005 |
| CN | 102504753 A | 6/2012 |
| CN | 103013358 A | 4/2013 |
| CN | 103305178 A | 9/2013 |
| DE | 19618720 A1 | 11/1996 |
| DE | 19826712 A1 | 12/1999 |
| DE | 19913353 A1 | 9/2000 |
| DE | 19957900 A1 | 6/2001 |
| EP | 0007508 A2 | 2/1980 |
| EP | 0057474 A2 | 8/1982 |
| EP | 0287019 A2 | 10/1988 |
| EP | 0495751 A1 | 1/1992 |
| EP | 0615980 A2 | 9/1994 |
| EP | 1275668 A1 | 1/2003 |
| WO | WO 98/28252 | 7/1998 |
| WO | WO 98/33761 A1 | 8/1998 |
| WO | WO 2005/057286 A1 | 6/2005 |
| WO | WO 2011/006947 A1 | 1/2011 |
| WO | WO 2011/141424 A1 | 11/2011 |
| WO | WO 2012/126695 A1 | 9/2012 |

OTHER PUBLICATIONS

International Search Report, PCT/EP2014/072726, dated Nov. 27, 2014.
International Written Opinion, PCT/EP2014/072726, dated Nov. 27, 2014.
International Preliminary Report on Patentability, PCT/EP2014/072726, dated May 10, 2016.

*Primary Examiner* — Wenwen Cai
(74) *Attorney, Agent, or Firm* — Curatolo Sidoti Co., LPA; Joseph G. Curatolo; Salvatore A. Sidoti

(57) ABSTRACT

The invention relates to coatings which can be obtained by adding mercapto groups to acrylates and/or by a radiation curing process, said coatings having good properties, to methods for producing same, and to the use thereof.

15 Claims, No Drawings

BINDING AGENT SYSTEMS

CROSS REFERENCE TO RELATED APPLICATIONS

This application is a national stage application of International Application No. PCT/EP2014/072726, filed 23 Oct. 2014, which claims priority from European Patent Application No. 13191636.3, filed 5 Nov. 2013, which applications are incorporated herein by reference.

The present invention relates to coatings which are possessed of good properties and obtainable by addition of mercapto groups onto acrylates and/or by radiation curing, to processes for preparing them, and to their use.

Coatings obtainable by radiation curing have been known for a long time. A disadvantage of such coatings is that the presence of oxygen at the curing stage disrupts the radical polymerization, meaning that optimum curing outcomes normally necessitate curing under inert gas. Moreover, there is usually no curing or only minimal curing in regions where it is not possible by (UV) light, with the aid of a photoinitiator, to induce radicals, in other words in what are called shadow regions.

This can be resolved by means of a further curing mechanism additionally to the radiation curing.

Known from U.S. Pat. No. 6,551,710 B1 is the reacting of radiation-curable acrylates with compounds containing thiol groups.

Disadvantages of these systems are that the coating compositions are applied from solvents and thus have a high VOC level, and that the mixtures of UV-curable compound and di- and polythiol component are mixed with one another for immediate reaction and hence have no storage life.

Reactive mixtures of acrylates and thiol compounds are also known from EP 1275668. Here as well the mixtures are prepared for immediate reaction; storage and a storage life are not envisaged.

A. K. O'Brian, N. B. Cramer, and C. N. Bowman, in "Oxygen inhibition in Thiol-Acrylate Photopolymerizations", J. Polym. Sci., Part A: Polym. Chem. 2006, 44, 2007-2014, describe the influence of the presence of oxygen ($O_2$) on the copolymerization of acrylates with thiols in bulk. For a given concentration of thiol functionalities, thiols of higher functionality lead to more rapid polymerization, making it even more difficult for the system to be stabilized.

A known coating system that remains largely unaffected by the presence of oxygen in curing is that of two-component epoxy resins. For the curing, however, these resins require frequently toxic amines, and react only very slowly at low temperatures.

In order to diminish a reaction between thiol compounds and systems containing double bonds it is necessary, according to the teaching of U.S. Pat. No. 5,459,173, to stabilize them.

WO 2012/126695 describes storage-stable mixtures of polyacrylates and polythiols. The mixtures described have a satisfactory storage stability, but the adhesion of the resulting coatings to surfaces is insufficient.

WO 2005/057286 discloses α-(1'-hydroxyalkyl)acrylates which are obtained by the reaction of di- or polyacrylates with aldehydes or of di- or polyaldehydes with monoacrylates. This type of reaction is also known as a Baylis-Hillman reaction. These products can be cured by radiation curing or by reaction with isocyanates in a dual-cure reaction.

WO 2011/141424 discloses branched polymers (S), containing hydroxyl groups and acrylate groups, which have α-(1'-hydroxyalkyl)acrylate groups, and are obtainable by reaction of at least one carbonyl compound (A), selected from the group consisting of

- carbonyl compounds (Ax) having more than two carbonyl groups and
- dicarbonyl compounds (Ax) having precisely two carbonyl groups, the carbonyl groups both in (A2) and in (Ax) being selected, in each case independently of one another, from the group consisting of
- aldehyde groups and
- keto groups, and
at least one acrylate compound (B) selected from the group consisting of

- acrylate compounds (By) having more than two acrylate groups and
- diacrylate compounds (B2), with the proviso that the average functionality of the compounds (A) comprising carbonyl groups and/or the average functionality of the compounds (B) comprising acrylate groups is more than 2.

Likewise disclosed is the curing of such polymers by radiation or dual-cure curing.

It was an object of the present invention to provide coating compositions which cure even at low temperatures by interreaction of the components and produce coatings possessed of good properties.

The object has been achieved by means of coating compositions comprising

- at least one compound (S) having at least two α-(1'-hydroxyalkyl)acrylate groups,
- optionally at least one compound (S1) having one α-(1'-hydroxyalkyl)acrylate group,
- at least one compound (C) which carries at least two thiol groups,
- optionally at least one reactive diluent (D) having a number-average molecular weight $M_n$ of less than 1000 g/mol and having at least two (meth)acrylate groups,
- optionally at least one catalyst (E2) which is able to accelerate the addition of thiol groups onto acrylate groups, and
- optionally at least one photoinitiator (F).

An advantage of the coating compositions of the invention is that they can be used as paints, coatings, sealants, corrosion inhibitors and/or as adhesives with high adhesiveness and low curing temperature.

Among the compounds (S), which carry α-(1'-hydroxyalkyl)acrylate groups, a distinction is made between those compounds (S1) which carry precisely one α-(1'-hydroxyalkyl)acrylate group, hence being obtainable by reaction of a monoacrylate with a monocarbonyl compound (see below); compounds (S2) having at least two α-(1'-hydroxyalkyl)acrylate groups, obtainable by reaction of an acrylate with a functionality of two or more with monocarbonyl compounds and/or by reaction of compounds having precisely one acrylate group and compounds having at least two carbonyl groups (see below); and compounds (Sz), which are obtainable by reaction of a compound having at least two acrylate groups and compounds having at least two carbonyl groups.

The compounds (S1) here function as low molecular mass monomers in the coating composition, and contribute to the desired molecular weight elevation and hence to the reduction in volatility of individual components in the system, but not to the crosslinking, whereas (S2) and (Sz), by virtue of their functionality of at least 2 based on activated double bonds, lead to crosslinking in the coating.

In comparison to the compounds (Sz), the compounds (S2) are generally not polymers.

Suitable compounds (S) may carry one or more, as for example 1 to 10, preferably 1 to 6, more preferably 1 to 4, very preferably 2 to 4, and more particularly 3 to 4 α-(1'-hydroxyalkyl)acrylate groups. The compounds may also be a mixture of compounds, which then have the requisite functionality on statistical average. The requisite average functionality in terms of α-(1'-hydroxyalkyl)acrylate groups is intended here to be greater than 1, preferably on average between 1.1 and 10, more preferably between 1.1 and 8, very preferably between 1.3 and 8, and especially between 1.3 and 6.

The number-average molecular weight $M_n$ of these compounds (S), determined by gel permeation chromatography with tetrahydrofuran as eluent and polymethyl methacrylate (PMMA) as standard, may amount, for example, to up to 5000, preferably from 200 up to 3000, more preferably between 250 and 2000, and more particularly between 300 and 1500 g/mol.

The polydispersity (ratio of number-average molecular weight $M_n$ to weight-average molecular weight $M_w$) of the compounds (S) is generally from 1.1 to 30, preferably 1.2 to 20, more preferably 1.2 to 15, very preferably up to 10. The polydispersity may especially be up to 5, and even up to 3.

The method for determining the polydispersity is described in Analytiker Taschenbuch Vol. 4, pages 433 to 442, Berlin 1984.

Examples of such α-(1'-hydroxyalkyl)acrylates (S) are compounds which are obtainable by reaction of a mono- or polyfunctional acrylate with a mono- or polyfunctional carbonyl compound.

Examples of carbonyl compounds are aldehydes or ketones, preferably aldehydes.

The compounds (S1) are obtainable by reaction of a monofunctional acrylate (I) with a monofunctional carbonyl compound (II).

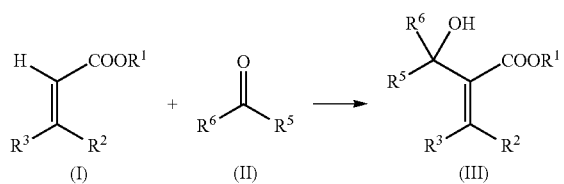

The compounds (S2) are obtainable by reaction of an acrylate (IV) having a functionality of two or more with a monofunctional carbonyl compound (II).

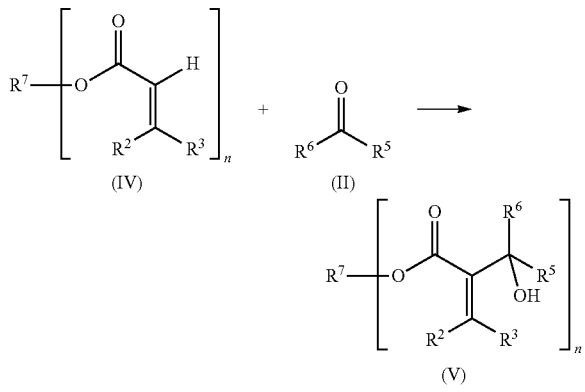

Further compounds (S2) are obtainable by reaction of a monofunctional acrylate (I) with a carbonyl compound (VI) having a functionality of two or more.

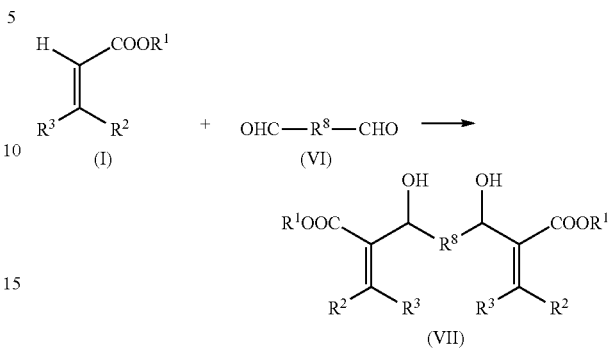

In these Compounds $R^1$, $R^2$, and $R^3$ independently of one another are $C_1$-$C_{18}$-alkyl, a radical which is optionally interrupted by one or more oxygen atoms and/or sulfur atoms and/or by one or more substituted or unsubstituted imino groups and is $C_2$-$C_{18}$-alkyl, $C_2$-$C_{18}$-alkenyl, $C_6$-$C_{12}$-aryl, $C_5$-$C_{12}$-cycloalkyl, or a five- to six-membered heterocycle with oxygen, nitrogen and/or sulfur atoms, it being possible for the stated radicals to be substituted in each case by aryl, alkyl, aryloxy, alkyloxy, heteroatoms and/or heterocycles, $R^2$ and/or $R^3$ additionally are hydrogen, $C_1$-$C_{18}$-alkoxy optionally substituted by aryl, alkyl, aryloxy, alkyloxy, heteroatoms and/or heterocycles, or —COOR$^4$, $R^2$ may additionally, together with $R^1$, form a ring, in which $R^2$ may be a carbonyl group, and so the group COOR$^1$ and $R^2$ together form an acid anhydride group —(CO)—O—(CO)—, $R^4$ has the same definition as listed for $R^1$, but may be different from $R^1$, $R^5$ and $R^6$ independently of one another are hydrogen, $C_1$-$C_{18}$-alkyl, a radical which is optionally interrupted by one or more oxygen atoms and/or sulfur atoms and/or by one or more substituted or unsubstituted imino groups and is $C_2$-$C_{18}$-alkyl, $C_2$-$C_{18}$-alkenyl, $C_6$-$C_{12}$-aryl, $C_5$-$C_{12}$-cycloalkyl, or a five- to six-membered heterocycle with oxygen, nitrogen and/or sulfur atoms, it being possible for the stated radicals to be substituted in each case by aryl, alkyl, aryloxy, alkyloxy, heteroatoms and/or heterocycles, or to together form a ring, n is a positive integer from 2 to 10, $R^7$ is an n-valent organic radical having 1 to 50 carbon atoms, which may be unsubstituted or substituted by halogen, $C_1$-$C_8$-alkyl, $C_2$-$C_8$-alkenyl, carboxyl, carboxy-$C_1$-$C_8$-alkyl, $C_1$-$C_{20}$-acyl, $C_1$-$C_8$-alkoxy, $C_6$-$C_{12}$-aryl, hydroxyl or hydroxyl-substituted $C_1$-$C_8$-alkyl, and/or may have one or more —(CO)—, —O(CO)O—, —(NH)(CO)O—, —O(CO)(NH)—, —O(CO)—, or —(CO)O— groups, and $R^8$ is a radical which is unsubstituted or substituted by halogen, $C_1$-$C_8$-alkyl, $C_2$-$C_8$-alkenyl, carboxyl, carboxy-$C_1$-$C_8$-alkyl, $C_1$-$C_{20}$-acyl, $C_1$-$C_8$-alkoxy, $C_6$-$C_{12}$-aryl, hydroxyl or hydroxyl-substituted $C_1$-$C_8$-alkyl and is $C_6$-$C_{12}$-arylene, $C_3$-$C_{12}$-cycloalkylene, $C_1$-$C_{20}$-alkylene, or $C_2$-$C_{20}$-alkylene interrupted by one or more oxygen atoms and/or sulfur atoms and/or by one or more substituted or unsubstituted imino groups and/or by one or more —(CO)—, —O(CO)O—, —(NH)(CO)O—, —O(CO)(NH)—, —O(CO)—, or —(CO)O— groups, or is a single bond.

In these Definitions $C_1$-$C_{18}$-alkyl optionally substituted by aryl, alkyloxy, alkyloxy, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, $C_1$-$C_{18}$-alkoxy optionally substituted by aryl, alkyl, aryloxy, alkyloxy, heteroatoms and/or heterocycles is, for example, methoxy, ethoxy, n-propyloxy, isopropyloxy, n-butyloxy, isobutyloxy, sec-butyloxy, tert-butyloxy, 6-hydroxy-1,4-dioxohexyl, 9-hydroxy-1,4,7-trioxononyl, 12-hydroxy-1,4,7,10-tetraoxododecyl, 6-methoxy-1,4-dioxohexyl, 9-methoxy-1,4,7-trioxononyl, 12-methoxy-1,4,7,10-tetraoxododecyl, 6-ethoxy-1,4-dioxohexyl, 9-ethoxy-1,4,7-trioxononyl, 12-ethoxy-1,4,7,10-tetraoxododecyl, 8-hydroxy-1,5-dioxooctyl, 12-hydroxy-1,5,9-trioxooctyl, 16-hydroxy-1,5,9,13-tetraoxohexadecyl, 8-methoxy-1,5-dioxooctyl, 12-methoxy-1,5,9-trioxooctyl, 16-methoxy-1,5,9,13-tetraoxohexadecyl, 8-ethoxy-1,5-dioxooctyl, 12-ethoxy-1,5,9-trioxooctyl, 16-ethoxy-1,5,9,13-tetraoxohexadecyl, 10-hydroxy-1,6-dioxodecyl, 15-hydroxy-1,6,11-trioxopentadecyl, 10-methoxy-1,6-dioxodecyl, 15-methoxy-1,6,11-trioxopentadecyl, 10-ethoxy-1,6-dioxodecyl or 15-ethoxy-1,6,11-trioxopentadecyl, $C_2$-$C_{18}$-alkyl optionally interrupted by one or more oxygen atoms and/or sulfur atoms and/or by one or more substituted or unsubstituted imino groups is, for example, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-dioxatetradecyl.

There is no limit on the number of oxygen and/or sulfur atoms and/or imino groups. In general the number is not more than 5 in the radical, preferably not more than 4, and very preferably not more than 3.

Moreover there is generally at least one carbon atom, preferably at least two, between two heteroatoms.

Substituted and unsubstituted imino groups may be, for example, imino, methylimino, isopropylimino, n-butylimino, or tert-butylimino.

Furthermore $C_2$-$C_{18}$-alkenyl optionally substituted by aryl, alkyl, aryloxy, alkyloxy, heteroatoms and/or heterocycles is, for example, vinyl, 1-propenyl, allyl, methallyl, 1,1-dimethylallyl, 2-butenyl, 2-hexenyl, octenyl, undecenyl, dodecenyl, octadecenyl, 2-phenylvinyl, 2-methoxyvinyl, 2-ethoxyvinyl, 2-methoxyallyl, 3-methoxyallyl, 2-ethoxyallyl, 3-ethoxyallyl or 1- or 2-chlorovinyl, $C_6$-$C_{12}$-aryl optionally substituted by aryl, alkyl, aryloxy, alkyloxy, heteroatoms and/or heterocycles is, for example, phenyl, tolyl, xylyl, α-naphthyl, β-naphthyl, 4-biphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl.

$C_5$-$C_{12}$-cycloalkyl optionally substituted by aryl, alkyl, aryloxy, alkyloxy, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl, and also a saturated or unsaturated bicyclic system such as norbornyl or norbornenyl, for example, a five- to six-membered heterocycle with oxygen, nitrogen and/or sulfur atoms is, for example, furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl, and $C_1$ to $C_4$-alkyl is, for example, methyl, ethyl, propyl, isopropyl, n-butyl, sec-butyl or tert-butyl.

There is no limit on the number of substituents in the radicals indicated. For radicals having one to three carbon atoms, the number is generally up to 3 substituents, preferably up to 2, and more preferably up to one. For radicals having four to six carbon atoms, the number is generally up to 4 substituents, preferably up to 3, and more preferably up to one. For radicals having more than seven carbon atoms, the number is generally up to 6 substituents, preferably up to 4, and more preferably up to two.

$R^1$ is preferably a radical which is substituted by aryl, alkyl, aryloxy, alkyloxy, heteroatoms and/or heterocycles and is $C_1$-$C_{18}$-alkyl or $C_5$-$C_{12}$-cycloalkyl, as for example methyl, ethyl, propyl, isopropyl, n-butyl, sec-butyl, tert-butyl, pentyl, hexyl, heptyl, octyl, 2-ethylhexyl, 2-hydroxyethyl, 2-hydroxypropyl, 3-hydroxypropyl, 4-hydroxybutyl, 6-hydroxyhexyl, cyclopentyl, cyclohexyl, cyclooctyl, cyclododecyl, methylcyclopentyl, dimethylcyclopentyl, methylcyclohexyl, dimethylcyclohexyl, norbornyl or norbornenyl, $R^1$ more preferably being methyl, ethyl, propyl, isopropyl, n-butyl, sec-butyl, tert-butyl, pentyl, hexyl, heptyl, octyl, 2-ethylhexyl, 2-hydroxyethyl, 2-hydroxypropyl, 3-hydroxypropyl, 4-hydroxybutyl or 6-hydroxyhexyl, very preferably methyl, ethyl, propyl, isopropyl, n-butyl, sec-butyl, tert-butyl or 2-ethylhexyl, and more particularly methyl, ethyl, n-butyl or 2-ethylhexyl.

$R^2$ is preferably hydrogen, or is $C_1$-$C_{18}$-alkyl substituted by aryl, alkyl, aryloxy, alkyloxy, heteroatoms and/or heterocycles, or is a carbonyl group which is connected to $R^1$, and so the group $COOR^1$ and $R^2$ together form an acid anhydride group —(CO)—O—(CO)—; more preferably hydrogen, methyl, ethyl, propyl, isopropyl, n-butyl, sec-butyl or tert-butyl, very preferably hydrogen or methyl, and more particularly hydrogen.

$R^3$ is preferably hydrogen, or is $C_1$-$C_{18}$-alkyl substituted by aryl, alkyl, aryloxy, alkyloxy, heteroatoms and/or heterocycles, more preferably hydrogen or $C_1$-$C_4$-alkyl, which in the context of this specification is understood to mean methyl, ethyl, propyl, isopropyl, n-butyl, sec-butyl or tert-butyl; very preferably hydrogen or methyl, and more particularly hydrogen.

$R^4$ is preferably methyl, ethyl, propyl, isopropyl, n-butyl, sec-butyl or tert-butyl, more preferably methyl or ethyl.

$R^5$ and $R^6$ independently of one another are preferably hydrogen or a radical which is substituted by aryl, alkyl, aryloxy, alkyloxy, heteroatoms and/or heterocycles and is $C_1$-$C_{18}$-alkyl, $C_2$-$C_{18}$-alkenyl, $C_6$-$C_{12}$-aryl or $C_5$-$C_{12}$-cycloalkyl, more preferably hydrogen or a radical which is substituted by aryl, alkyl, aryloxy, alkyloxy, heteroatoms and/or heterocycles and is $C_1$-$C_{18}$-alkyl or $C_6$-$C_{12}$-aryl, very preferably hydrogen, methyl, ethyl, propyl, isopropyl, n-butyl, sec-butyl, tert-butyl, phenyl, benzyl, tolyl, o-, m-, or p-xylyl, 2-, 3-, or 4-methoxyphenyl, 2-, 3-, or 4-chlorophenyl, or 2-, 3- or 4-nitrophenyl, and more particularly hydrogen, methyl, ethyl, propyl, isopropy or phenyl.

Preferably at least one of the two radicals $R^5$ and $R^6$ is hydrogen.

$R^7$ is preferably an organic radical derived from an n-hydric alcohol by removal of n hydroxyl groups, derived for example from di- to decahydric alcohols, more preferably derived from di- to hexahydric alcohols, very preferably derived from di- to tetrahydric alcohols, and more particularly derived from di- to trihydric alcohols.

$R^8$ is preferably $C_1$-$C_{20}$-alkylene, $C_3$-$C_{12}$-cycloalkylene or $C_6$-$C_{12}$-arylene which is unsubstituted or substituted by halogen, $C_1$-$C_6$-alkyl, $C_2$-$C_8$-alkenyl, carboxyl, carboxy-$C_1$-$C_8$-alkyl, $C_1$-$C_{20}$-acyl, $C_1$-$C_6$-alkoxy, $C_6$-$C_{12}$-aryl, hydroxyl or hydroxyl-substituted $C_1$-$C_8$-alkyl, or is $C_2$-$C_{20}$-alkylene which is interrupted by one or more oxygen atoms and/or sulfur atoms and/or by one or more substituted or unsubstituted imino groups and/or by one or more —(CO)—, —O(CO)O—, —(NH)(CO)O—, —O(CO)(NH)—, —O(CO)— or —(CO)O— groups, or is a single bond; more preferably a single bond or $C_1$-$C_{20}$-alkylene which is unsubstituted or substituted by halogen, $C_1$-$C_6$-alkyl, $C_2$-$C_8$-alkenyl, carboxyl, carboxy-$C_1$-$C_6$-alkyl, $C_1$-$C_{20}$-acyl, $C_1$-$C_8$-alkoxy, $C_6$-$C_{12}$-aryl, hydroxyl or hydroxyl-substituted $C_1$-$C_8$-alkyl; and very preferably $C_1$-$C_{20}$-alkylene which is unsubstituted or substituted by halogen, $C_1$-$C_8$-alkyl, $C_2$-$C_8$-alkenyl, carboxyl, carboxy-$C_1$-$C_8$-alkyl, $C_1$-$C_{20}$-acyl, $C_1$-$C_8$-alkoxy, $C_6$-$C_{12}$-aryl, hydroxyl or hydroxyl-substituted $C_1$-$C_8$-alkyl.

Examples of compounds (I) are methyl acrylate, ethyl acrylate, n-propyl acrylate, isopropyl acrylate, n-butyl acrylate, sec-butyl acrylate, tert-butyl acrylate, 2-ethylhexyl acrylate, 2-hydroxyethyl acrylate, 5-hydroxy-3-oxapentyl acrylate, 2-hydroxypropyl acrylate, 3-hydroxypropyl acrylate, 4-hydroxybutyl acrylate, 6-hydroxyhexyl acrylate, dihydrodicyclopentadienyl acrylate, norbornyl acrylate, cyclohexyl acrylate, cyclopentyl acrylate, cyclododecyl acrylate, phenyl acrylate, methyl crotonate, ethyl crotonate, maleic anhydride, dimethyl maleate, diethyl maleate, di-n-butyl maleate, dimethyl fumarate or diethyl fumarate.

Preferred compounds (I) are methyl acrylate, ethyl acrylate, n-propyl acrylate, isopropyl acrylate, n-butyl acrylate, sec-butyl acrylate, tert-butyl acrylate, and 2-ethylhexyl acrylate.

Particularly preferred compounds (1) are methyl acrylate, ethyl acrylate, n-butyl acrylate, and 2-ethylhexyl acrylate.

Examples of compounds (II) are formaldehyde, acetaldehyde, propionaldehyde, n-butyraldehyde, isobutyraldehyde, heptanal, nonanal, cyclopentylaldehyde, cyclohexylaldehyde, benzaldehyde, 3-chlorobenzaldehyde, 4-chlorobenzaldehyde, 3-hydroxybenzaldehyde, 4-hydroxybenzaldehyde, 3-methoxybenzaldehyde, 4-methylbenzaldehyde, phenylacetaldehyde, salicylaldehyde, chloral hydrate, 4-dimethylaminobenzaldehyde, furfural, 2-nitrobenzaldehyde, vanillin, anisaldehyde, cinnamaldehyde, pyridinecarbaldehyde, hydroxypivalaldehyde, dimethylolpropionaldehyde, dimethylolbutyraldehyde, trimethylolacetaldehyde, acetone, ethyl methyl ketone, diethyl ketone, methyl vinyl ketone, isobutyl methyl ketone, acetophenone, propiophenone, benzophenone, cyclopentanone, cyclohexanone, or cyclododecanone.

Preferred compounds (II) are the aldehydes listed, particular preference being given to formaldehyde, acetaldehyde, propionaldehyde, n-butyraldehyde, isobutyraldehyde, benzaldehyde, 3-hydroxybenzaldehyde, 4-hydroxybenzaldehyde, hydroxypivalaldehyde, dimethylolpropionaldehyde, dimethylolbutyraldehyde, and trimethylolacetaldehyde, very preferably formaldehyde, acetaldehyde, propionaldehyde, n-butyraldehyde, isobutyraldehyde, 3-hydroxybenzaldehyde, 4-hydroxybenzaldehyde, benzaldehyde, and dimethylolbutyraldehyde, and more particularly formaldehyde and acetaldehyde.

In one preferred embodiment of the present invention use is made as compound (II) of an aromatic aldehyde, more preferably benzaldehyde, 3-hydroxybenzaldehyde, and 4-hydroxybenzaldehyde, and very preferably benzaldehyde. This embodiment Is preferred especially when the coating compositions of the invention are to be used as adhesives.

For the preparation of non-ether-bridged Baylis-Hillman products, it is advantageous to use aldehydes in free form, i.e., to suppress the formation of formals of these aldehydes, of the formula $(R^5—CHO)_w$, in which w is a positive integer, by using suitable aldehydes and/or selecting suitable solvents. While the systems obtained in U.S. Pat. No. 5,380,901, owing to the use of para-formaldehyde or para-formaldehyde/DMSO, in which the formation of formals is not suppressed, are consistently ether-bridged systems, it is advantageous to use aldehydes with a high fraction of low formals—for example, w≤20, preferably w≤10, and more preferably w≤5.

The fraction of these low formals ought, based on the total amount of aldehyde, to be, for example, at least 50%, preferably at least 60%, more preferably at least 70%, and very preferably at least 80%.

In the case of formaldehyde, for example, this is achieved by using formaldehyde in the form of aqueous solutions, with a strength, for example, of not more than 49%, and preferably up to 37%.

By virtue of these measures it is possible to suppress the fraction of ether-bridged Baylis-Hillman products. This fraction is determined as the molar fraction of the aldehyde equivalents in ether bridges (—CHR$^5$—O—CHR$^5$—) among the total of the Baylis-Hillman products, in other words ether bridges and terminal —CHR$^5$OH— groups.

The ether bridges therefore correspond to 2 mole equivalents of aldehyde R$^5$—CHO, whereas the terminal —CHR$^5$OH— groups correspond to one mole equivalent of aldehyde.

Determining the fractions of the groups can be done by NMR spectroscopy, for example. In the case of formaldehyde, in $^1$H NMR spectra in CDCl$_3$, the CH$_2$—O—CH$_2$ group appears as a singlet, or as a singlet split by allyl coupling, at about δ=4.22 ppm (see U.S. Pat. No. 5,380,901), and the CH$_2$OH group appears at about 4.30 ppm, or, in $^{13}$C NMR spectra in CDCl$_3$, the CH—O—CH$_2$ group appears at about δ=68.7 ppm and the CH$_2$OH group at about 62.0 ppm.

By means of the measures according to the invention that are described above, of using aldehydes with a low fraction of formals, it is possible to lower the fraction of the ether bridges generally to 50% or less, preferably to 40% or less, more preferably to not more than 33%, very preferably to not more than 25%, and more particularly to not more than 15%.

Contrastingly, the fraction of ether bridges in the silicone diacrylate shown in U.S. Pat. No. 5,380,901 column 5, with n=2 and 95% x=—CH$_2$OH (U.S. Pat. No. 5,380,901, column 5, lines 57-59) is about 69%. In dual-cure curing, however, a high fraction of terminal OH groups is advantageous for the reaction with OH-reactive groups.

Examples of compounds (IV) are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3-, and 1,4-cyclohexanedimethanol diacrylate, 1,2-, 1,3-, or 1,4-cyclohexanediol diacrylate, trimethylolpropane triacrylate, ditrimethylolpropane pentaacrylate or hexaacrylate, pentaerythritol triacrylate or tetraacrylate, glycerol diacrylate or triacrylate, and also diacrylates and polyacrylates of sugar alcohols, such as, for example, sorbitol, mannitol, diglycerol, threitol, erythritol, adonitol (ribitol), arabitol (lyxitol), xylitol, dulcitol (galactitol), maltitol, or isomalt, or of polyester polyols, polyetherols, polyTHF having a molar mass of between 162 and 2000 g/mol, poly-1,3-propanediol having a molar mass of between 134 and 1178 g/mol, polyethylene glycol having a molar mass of between 106 and 898 g/mol, and also urethane acrylates or polycarbonate acrylates.

Further examples are acrylates of compounds of the formula (IVa) to (IVc),

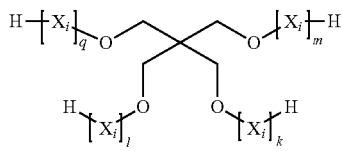

(IVa)

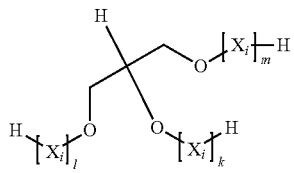

(IVb)

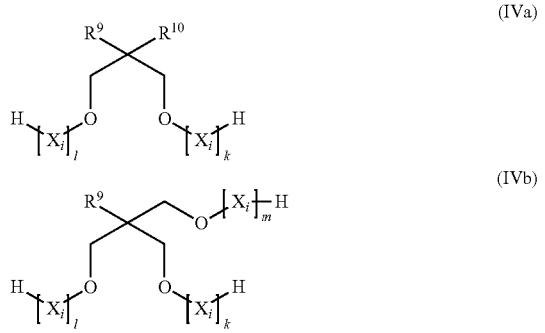

(IVc)

(IVd)

in which
R$^9$ and R$^{10}$ independently of one another are hydrogen or C$_1$-C$_{18}$-alkyl,
k, l, m, and q independently of one another are each an integer from 1 to 10, preferably 1 to 5, and more preferably 1 to 3, and
each X$_i$ for i=1 to k, 1 to l, 1 to m, and 1 to q may be selected independently of one another from the group —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O—, and —CHPh-CH$_2$—O—, preferably from the group —CH$_2$—CH$_2$—O—, —CH$_2$—CH(CH$_3$)—O—, and —CH(CH$_3$)—CH$_2$—O—, and more preferably —CH$_2$—CH$_2$—O—,
in which Ph is phenyl and Vin is vinyl.

Preferably these are acrylates of singly to vigintuply and more preferably triply to decuply ethoxylated, propoxylated, or mixedly ethoxylated and propoxylated, and more particularly exclusively ethoxylated, neopentyl glycol, glycerol, trimethylolpropane, trimethylolethane, trimethylolmethane, or pentaerythritol.

Preferred compounds (IV) are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythritol tetraacrylate, polyester polyol acrylates, polyetherol acrylates, and triacrylate of singly to vigintuply ethoxylated trimethylolpropane, and also tetraacrylate of singly to vigintuply ethoxylated pentaerythritol.

Particularly preferred compounds are 1,4-butanediol diacrylate, 1,6-hexanediol diacrylate, trimethylolpropane triacrylate, pentaerythritol tetraacrylate, and triacrylate of singly to vigintuply ethoxylated trimethylolpropane, and also tetraacrylate of singly to vigintuply ethoxylated pentaerythritol.

Polyester polyols are known for example from Ullmanns Encyklopädie der technischen Chemie, 4th edition, volume 19, pp. 62 to 65. Preference is given to using polyester polyols obtained by reacting dihydric alcohols with dibasic carboxylic acids. In lieu of the free polycarboxylic acids it is also possible to use the corresponding polycarboxylic anhydrides or corresponding polycarboxylic esters of lower alcohols or mixtures thereof to prepare the polyester polyols. The polycarboxylic acids may be aliphatic, cycloaliphatic, araliphatic, aromatic or heterocyclic and may optionally be substituted, by halogen atoms for example, and/or unsaturated. Examples thereof that may be mentioned include the following:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$-alkyl esters for example, preferably methyl, ethyl or n-butyl esters, of said acids are used. Preference is given to dicarboxylic acids of the general formula HOOC—$(CH_2)_y$—COOH, y being a number from 1 to 20, preferably an even number from 2 to 20; more preferably succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyTHF having a molar mass between 162 and 2000, poly-1,3-propanediol having a molar mass between 134 and 1178, poly-1,2-propanediol having a molar mass between 134 and 898, polyethylene glycol having a molar mass between 106 and 458, neopentyl glycol, neopentyl glycol hydroxypivalate, 2-ethyl-1,3-propanediol, 2-methyl-1,3-propanediol, 2,2-bis(4-hydroxycyclohexyl)propane, 1.1-, 1,2-, 1,3-, and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt.

Preferred alcohols are those of the general formula HO—$(CH_2)_x$—OH, x being a number from 1 to 20, preferably an even number from 2 to 20. Preference is given to ethylene glycol, butane-1,4-diol, hexane-1,6-diol, octane-1,8-diol, and dodecane-1,12-diol. Preference is further given to neopentyl glycol.

Also suitable, furthermore, are polycarbonatediols, such as may be obtained, for example, by reacting phosgene with an excess of the low molecular weight alcohols specified as constituent components for the polyester polyols.

Also suitable are lactone-based polyesterdiols, which are homopolymers or copolymers of lactones, preferably hydroxyl-terminated adducts of lactones with suitable difunctional starter molecules. Suitable lactones include, preferably, those deriving from compounds of the general formula HO—$(CH_2)_z$—COOH, z being a number from 1 to 20 and it being possible for an H atom of a methylene unit to also be substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components are the low molecular weight dihydric alcohols specified above as a constituent component for the polyester polyols. The corresponding polymers of ε-caprolactone are particularly preferred. Lower polyesterdiols or polyetherdiols as well can be used as starters for preparing the lactone polymers. In lieu of the polymers of lactones it is also possible to use the corresponding, chemically equivalent polycondensates of the hydroxycarboxylic acids corresponding to the lactones.

The compound (VI) comprises at least one, preferably precisely one, polyfunctional, preferably difunctional, carbonyl compound, especially a diketone or dialdehyde, very especially a dialdehyde.

Particularly preferred among the dialdehydes are those which on the carbon atom positioned a to the aldehyde function have no hydrogen atom that is abstractable with the base used.

Examples of compounds (VI) are glyoxal, malonaldehyde, succinaldehyde, glutaraldehyde, capronaldehyde, furan-2,5-dialdehyde, pyrrole-2,5-dialdehyde, pyridine-2,6-dialdehyde, phthalaldehyde, isophthalaldehyde, and terephthalaldehyde, more preferably glyoxal, succinaldehyde, glutaraldehyde, isophthalaldehyde, and terephthalaldehyde.

Condensates of formaldehyde are also conceivable, in the form, for example, of carbonyl-functionalized novolaks and lignin.

In one preferred embodiment of the present invention use is made as compound (VI) of an aromatic aldehyde, more preferably phthalaldehyde, isophthalaldehyde or terephthalaldehyde, and very preferably terephthalaldehyde. This embodiment is preferred especially when the coating compositions of the invention are to be used for adhesives.

Further preferred are compounds of the formula (V) in which n is at least 3 and preferably 3 or 4. Especially preferred are those compounds in which the radical $R^7$ derives from optionally alkoxylated trimethylolpropane or pentaerythritol. By virtue of the simultaneous presence of acrylate and hydroxyl groups, these compounds exhibit particular suitability for dual-cure curing.

To prepare component (Sz) it is necessary to react at least one difunctional carbonyl compound (A2) and/or at least one more-than-difunctional carbonyl compound (Ax) with at least one difunctional acrylate compound (B2) and/or at least one more-than-difunctional acrylate compound (By).

The following reaction possibilities lead to the components (Sz) of the invention:

1) at least one compound (A2) and at least one compound (B2),
2) at least one compound (Ax) and at least one compound (By),
3) at least one compound (Ax) and at least one compound (B2),
4) at least one compound (A2) and at least one compound (By).
5) at least one compound (Ax) and at least one compound (By) and at least one compound (A2),
6) at least one compound (Ax) and at least one compound (By) and at least one compound (B2),
7) at least one compound (Ax) and at least one compound (B2) and at least one compound (A2).
8) at least one compound (By) and at least one compound (A2) and at least one compound (B2),
9) at least one compound (Ax) and at least one compound (By) and at least one compound (A2) and at least one compound (B2).

Preferred among these are reaction possibilities 4), 8) and 1), with particular preference being given to reaction possibility 8), in which at least one compound (By) and at least one compound (A2) and at least one compound (B2) are reacted with one another.

In one preferred embodiment of the present invention, compounds (Sz) are prepared by reaction possibility 1), for which at least one compound (A2) and at least one compound (B2) are reacted with one another.

The at least one carbonyl compound (Ax) having more than two carbonyl groups has on average more than two carbonyl groups, preferably at least 3, more preferably 3 to 6, very preferably 3 to 5, more particularly 3 to 4, and especially 3.

In this context there may be at least one, as for example one to four, preferably one to three, more preferably one to two, and very preferably precisely one compound (Ax).

The carbonyl groups therein are selected from the group consisting of
aldehyde groups and
keto groups;
the compounds in question are preferably either more-than-difunctional ketones or more-than-difunctional aldehydes, more preferably compounds having exclusively aldehyde groups.

These functional groups may be connected to one another in any way—for example, by aromatic, aliphatic, cycloaliphatic or heteroaromatic groups or combinations thereof, preferably by aromatic or aliphatic groups.

Preferred compounds (Ax) are, for example, aromatics substituted by three aldehyde groups, such as 1,2,3-, 1,2,4-, or 1,3,5-benzenetrialdehyde, 2,4,6-pyridinetrialdehyde, or hydroformylation products of alkanepolyenes having a corresponding number of C=C double bonds, preferably alkanetrienes. The average number of aldehyde groups in the mixture can be controlled through the number of C=C double bonds and hydroformylation. Products of these kinds are described in, for example, WO 98/28252, particularly from page 3, line 36 to page 11, line 44 therein, and also in examples 1 to 9 described therein.

A particularly preferred compound (Ax) is 1,3,5-benzenetrialdehyde.

Substances for use which are used for the reaction are optionally at least one, as for example one to four, preferably one to three, more preferably one to two, and very preferably precisely one difunctional carbonyl compound (A2), with the above proviso.

The reactive groups of the dicarbonyl compound (A2) having precisely two carbonyl groups are selected from the group consisting of
aldehyde groups (A2a) and
keto groups (A2b).

Among the compounds (A2), diketones and dialdehdyes are preferred, particular preference being given to a dialdehyde for compound (A2).

Preferably in the compound (A2) the two carbonyl groups are connected to one another by an aliphatic, cycloaliphatic or aromatic hydrocarbon radical.

In the case of the dialdehydes as compounds (A2), preference is given to compounds of the formula (VI)

OHC—R$^8$—CHO, as set out above.

Preferred compounds (A2) are glyoxal, malonaldehyde, succinaldehyde, glutaraldehyde, capronaldehyde, furan-2,5-dialdehyde, pyrrole-2,5-dialdehyde, pyridine-2,6-dialdehyde, phthalaldehyde, isophthalaldehyde, and terephthalaldehyde; particularly preferred are glyoxal, succinaldehyde, glutaraldehyde, isophthalaldehyde, and terephthalaldehyde.

In a preferred embodiment of the present invention, use is made as compound (A2) of an aromatic aldehyde, more preferably phthalaldehyde, isophthalaldehyde or terephthalaldehyde, and very preferably terephthalaldehyde. This embodiment is preferred especially when the coating compositions of the invention are to be used for adhesives.

The at least one acrylate compound (By) having more than two acrylate groups has on average more than two acrylate groups, preferably at least 3, more preferably 3 to 8, very preferably 3 to 6, more particularly 3 to 4, and especially 3.

There may here be at least one, one to four for example, preferably one to three, more preferably one to two, and very preferably precisely one compound (By).

The acrylate compounds (By) correspond to the above-described compounds of the formula (IV) with values for n of at least 3. The compounds in question may be, for example, acrylic esters of polyalcohols, such as polyols, polyetherols, polyesterols or polyacrylate polyols, with the corresponding functionality. Suitable compounds (By) may therefore be polyether acrylates, polyester acrylates, acrylated polyacrylatols or urethane acrylates having the desired functionality of more than 2.

Preferably these are acrylates of singly to vigintuply and more preferably triply to decuply ethoxylated, propoxylated, or mixedly ethoxylated and propoxylated, and more particularly exclusively ethoxylated, neopentyl glycol, glycerol, trimethylolpropane, trimethylolethane, or pentaerythritol.

Preferred compounds (B2) are ethylene glycol diacrylate 1,2-propanediol diacrylate, 1,3-propanediol diacrylate, 1,4-butanediol diacrylate, and 1,6-hexanediol diacrylate; preferred compounds (By) are trimethylolpropane triacrylate, glycerol triacrylate, pentaerythritol tetraacrylate, and triacrylate of singly to vigintuply ethoxylated trimethylolpropane, and also tetraacrylate of singly to vigintuply ethoxylated pentaerythritol.

Particularly preferred compounds (B2) are 1,4-butanediol diacrylate, 1,6-hexanediol diacrylate, and particularly preferred compounds (By) are glycerol triacrylate, trimethylolpropane triacrylate, pentaerythritol tetraacrylate, and triacrylate of singly to vigintuply ethoxylated trimethylolpropane, and also tetraacrylate of singly to vigintuply ethoxylated pentaerythritol.

As a further substance for use it is possible optionally to use at least one, one to four for example, preferably one to three, more preferably one to two, and very preferably precisely one difunctional acrylate (B2).

These compounds are, for example, the above-described compounds of the formula (IV) with n=2.

The diacrylate compound (82) comprises any desired difunctional acrylates, preferably diacrylates of alkanediols or cycloalkanediols and also lower polyalkylene glycols, preferably polyethylene glycols or polypropylene glycols, or—albeit less preferably—difunctional acrylamides of diamines, preferably of linear or branched aliphatic or cycloaliphatic diamines.

The compounds (B2) are preferably compounds with a molecular weight below 400 g/mol, more preferably structurally uniform compounds, i.e., compounds which exhibit no significant molecular weight distribution.

The alkanediols may preferably be ethylene glycol, 2,2-dimethyl-1,2-ethanediol, 1,3-propanediol, 1,2-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, neopentyl glycol, 2-ethyl-1,3-propanediol or 2-methyl-1,3-propanediol.

The cycloalkanediols may preferably be 2,2-bis(4-hydroxycyclohexyl)propane, 1,1-, 1,2-, 1,3- and 1,4-cyclohexanedimethanol, or 1,2-, 1,3-, or 1,4-cyclohexanediol.

The polyalkylene glycols may preferably be polyethylene glycols, polypropylene glycols, polyTHF or poly-1,3-propanediol. Particularly preferred are polyethylene glycols or polypropylene glycols as a mixture of the isomers.

Among the polyalkylene glycols, dimers to pentamers are preferred.

The diamines are preferably linear or branched aliphatic or cycloaliphatic primary and/or secondary diamines, such as 1,2-diaminoethane, 1,2- or 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane or piperazine, for example.

Particularly preferred diacrylates (B2) are ethylene glycol diacrylate, 1,2-propanediol diacrylate, 1,3-propanediol diacrylate, 1,3-butanediol diacrylate, 1,4-butanediol diacrylate, 1,6-hexanediol diacrylate, diethylene glycol diacrylate, dipropylene glycol diacrylate, tripropylene glycol diacrylate, N,N'-bisacryloyl-1,2-diaminoethane, N,N'-bisacryloyl-1,6-diaminohexane or N,N'-bisacryloylpiperazine.

Especially preferred compounds are 1,4-butanediol diacrylate, 1,6-hexanediol diacrylate, dipropylene glycol diacrylate, and tripropylene glycol diacrylate.

Implementing the Baylis-Hillman reaction is a matter known per se to the skilled person and the topic of a number of literature reviews.

The reaction may be carried out at a temperature of between 0° C. and 100° C., preferably 20 to 80° C., and more preferably 25° C. to 60° C.

In order to react ketones it may be necessary to apply high pressure.

Used as catalyst (E1) for preparing the Baylis-Hillman adducts is usually a tertiary amine or phosphine, as for example trimethylamine, triethylamine, tri-n-butylamine, ethyldiisopropylamine, methyldiisopropylamine, N-methylmorpholine, N-methylpiperidine, triethanolamine, N,N-dimethylethanolamine, 4-dimethylaminopyridine, 1,5-diazabicyclo[4.3.0]-non-5-ene (DBN), 1,8-diazabicyclo[5.4.0]-undec-7-ene (DBU), pyrrocoline, quinuclidine, 3-hydroxyquinuclidine, quinidine, trimethylphosphine, triethylphosphine, tri-n-butylphosphine, dimethylphenylphosphine, and preferably 1,4-diazabicyclo[2,2,2]octane (DABCO), 1,5-diazabicyclo[4.3.0]-non-5-ene (DBN), 1,8-diazabicyclo[5.4.0]-undec-7-ene (DBU), quinuclidine, and 3-hydroxyquinuclidine, and more preferably 1,4-diazabicyclo[2.2.2]octane (DABCO) and 3-hydroxyquinuclidine.

The catalyst is used in general in amounts of 1 to 100 mol % with respect to acrylic groups, preferably 2-50, more preferably 3-40, and very preferably 5-30 mol %.

The catalysis of the addition reaction may take place homogeneously, or heterogeneously with a catalyst bound to a support. In one preferred embodiment the catalyst (E) is removed from the reaction mixture again after the addition reaction, by means of ion exchangers, neutralization or extraction, for example.

It is further possible, in addition to the stated amine or phosphine catalysts, to use at least one cocatalyst in amounts of up to 5 wt %, preferably of 0.1 to 3, more preferably 0.2 to 2 wt %, which may comprise alcohols or phenols. The phenols, besides phenol, are preferably phenols which carry at least one alkyl chain on the aromatic ring.

Preferred phenols are alkylphenols, as for example o-, m- or p-cresol (methylphenol), 2-tert-butyl-4-methylphenol, 6-tert-butyl-2,4-dimethylphenol, 2,6-di-tert-butyl-4-methylphenol, 2-tert-butylphenol, 4-tert-butylphenol, 2,4-di-tert-butylphenol, 2-methyl-4-tert-butylphenol, 4-tert-butyl-2,6-dimethylphenol, or 2,2'-methylenebis(6-tert-butyl-4-methylphenol), 4,4'-oxybiphenyl, 3,4-methylenedioxydiphenol (sesamol), 3,4-dimethylphenol, hydroquinone, pyrocatechol (1,2-dihydroxybenzene), 2-(1'-methylcyclohex-1'-yl)-4,6-dimethylphenol, 2- or 4-(1'-phenyleth-1'-yl)phenol, 2-tert-butyl-6-methylphenol, 2,4,6-tris-tert-butylphenol, 2,6-di-tert-butylphenol, 2,4-di-tert-butylphenol, 4-tert-butylphenol, dodecylphenol, undecylphenol, decylphenol, nonylphenol [11066-49-2], octylphenol [140-66-9], 2,6-dimethylphenol, bisphenol A, bisphenol F, bisphenol B, bisphenol C, bisphenol S, 3,3',5,5'-tetrabromobisphenol A, 2,6-di-tert-butyl-p-cresol, Koresin® from BASF SE, methyl 3,5-di-tert-butyl-4-hydroxybenzoate, 4-tert-butylpyrocatechol, 2-hydroxybenzyl alcohol, 2-methoxy-4-methylphenol, 2,3,6-trimethylphenol, 2,4,5-trimethylphenol, 2,4,6-trimethylphenol, 2-Isopropylphenol, 4-isopropylphenol, 6-isopropyl-m-cresol, n-octadecyl β-(3,5-di-tert-butyl-4-hydroxyphenyl)propionate, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, 1,3,5-tris(3,5-di-tert-butyl-4-hydroxybenzyl) isocyanurate, 1,3,5-tris(3,5-di-tert-butyl-4-hydroxyphenyl) propionyloxyethyl isocyanurate, 1,3,5-tris(2,6-dimethyl-3-hydroxy-4-tert-butylbenzyl) isocyanurate or pentaerythritol tetrakis[β-(3,5-di-tert-butyl-4-hydroxyphenyl)propionate], 2,6-di-tert-butyl-4-dimethylaminomethylphenol, 6-isobutyl-2,4-dinitrophenol, 6-sec-butyl-2,4-dinitrophenol, Irganox® 565, 1141, 1192, 1222, and 1425 from BASF, octadecyl 3-(3',5'-di-tert-butyl-4'-hydroxyphenyl)propionate, hexadecyl 3-(3',5'-di-tert-butyl-4'-hydroxyphenyl)propionate, octyl 3-(3',5'-di-tert-butyl-4'-hydroxyphenyl)propionate, 3-thia-1,5-pentanediol bis[(3',5'-di-tert-butyl-4'-hydroxyphenyl)propionate], 4,8-dioxa-1,11-undecanediol bis[(3',5'-di-tert-butyl-4'-hydroxyphenyl)propionate], 4,8-dioxa-1,11-undecanediol bis[(3'-tert-butyl-4'-hydroxy-5'-methylphenyl) propionate], 1,9-nonanediol bis[(3',5'-di-tert-butyl-4'-hydroxyphenyl)propionate], 1,7-heptanediamine-bis[3-(3',5'-di-tert-butyl-4'-hydroxyphenyl)propionamide], 1,1-methanediamine-bis[3-(3',5'-di-tert-butyl-4'-hydroxyphenyl)propionamide], 3-(3',5'-di-tert-butyl-4'-hydroxyphenyl)propionic hydrazide, 3-(3',5'-dimethyl-4'-hydroxyphenyl)propionic hydrazide, bis(3-tert-butyl-5-ethyl-2-hydroxyphen-1-yl)methane, bis(3,5-di-tert-butyl-4-hydroxyphen-1-yl)methane, bis[3-(1'-methylcyclohex-1'-yl)-5-methyl-2-hydroxyphen-1-yl]methane, bis(3-tert-butyl-2-hydroxy-5-methylphen-1-yl)methane, 1,1-bis(5-tert-butyl-4-hydroxy-2-methylphen-1-yl)ethane, bis(5-tert-butyl-4-hydroxy-2-methylphen-1-yl) sulfide, bis(3-tert-butyl-2-hydroxy-5-methylphen-1-yl) sulfide, 1,1-bis(3,4-dimethyl-2-hydroxyphen-1-yl)-2-methylpropane, 1,1-bis(5-tert-butyl-3-methyl-2-hydroxy-phen-1-yl)butane, 1,3,5-tris [1'-(3'',5''-di-tert-butyl-4''-hydroxyphen-1''-yl)meth-1'-yl]-2,4,6-trimethylbenzene, 1,1,4-tris(5'-tert-butyl-4'-hydroxy-2'-methylphen-1'-yl)butane, alkoxyphenols, as for example 2-methoxyphenol (guaiacol, pyracatechol monomethyl ether), 2-ethoxyphenol, 2-isopropoxyphenol, 4-methoxyphenol (hydroquinone monomethyl ether), mono- or di-tert-butyl-4-methoxyphenol, 3,5-di-tert-butyl-4-hydroxyanisole, 3-hydroxy-4-methoxybenzyl alcohol, 2,5-dimethoxy-4-hydroxybenzyl alcohol (syringa alcohol), 4-hydroxy-3-methoxybenzaldehyde (vanillin), 4-hydroxy-3-ethoxybenzaldehyde (ethylvanillin), 3-hydroxy-4-methoxybenzaldehyde (isovanillin), 1-(4-hydroxy-3-methoxyphenyl)ethanone (acetovanillone), eugenol, dihydroeugenol, isoeugenol, or tocopherols, such as, for example, α-, β-, γ-, δ-, and ε-tocopherol, tocol or α-tocopherolhydroquinone.

The stoichiometry between acrylate groups and carbonyl compounds is generally 1:0.05-1.5, preferably 1:0.1-1.3, more preferably 1:0.2-1.0, and very preferably 1:0.4-1.0.

The molar ratio of more-than-difunctional compounds (Ax) and (By) in total to the sum total of the difunctional compounds (A2) and (B2) is generally 1:0-5, preferably 1:0.1 to 4, more preferably 1:0.25 to 3, very preferably 1:0.5 to 2, and more particularly 1:0.8-1.5.

The reaction may be carried out in a solvent; solvents which may be used are preferably water, petroleum ether, ligroin, toluene, benzene, xylene, tetrahydrofuran (THF), diethyl ether, dioxane, or alternatively the acrylate employed. The reaction can also be carried out in the absence of a solvent.

If the acrylate is used as solvent, the resulting reaction mixture, comprising both the acrylate used and α-(1′-hydroxyalkyl) acrylate, may be purified, or used as such without the acrylate being removed, with the acrylate then functioning as reactive diluent (D).

It is not vital to purify the reaction mixture, though of course the mixture may naturally be purified by distillation, stripping, acidic, alkaline or neutral washing, filtration or the like.

In one preferred embodiment the carbonyl compound is used substoichiometrically in relation to the acrylate groups, thus giving reaction mixtures which comprise the Baylis-Hillman product in a mixture with the acrylate employed. Mixtures of these kinds may be used with advantage in coating compositions for radiation curing and/or dual-cure curing.

The polymers (Sz) according to the above-recited reaction possibilities 2) to 9) are notable over the polymers obtainable according to reaction possibility 1) in that they are branched, whereas the polymers obtainable according to reaction possibility 1) produce linear polymers. Preference is given to linear polymers, obtainable in accordance with reaction possibility 1).

The degree of branching (DB) of a branched polymer is calculated as disclosed in H. Frey et al., Acta Polym. 1997, 48, 30-35; see formula (1) therein.

According to formula (1) from Frey et al. the degree of branching is defined as

DB[%]=(D+T)/(D+L+T), multiplied by 100 in which

D, T and L are the respective fractions of branching, terminal or linearly incorporated monomer units in the polymer.

The branched polymers among the compounds (Sz) generally have a degree of branching of at least 5%, preferably of at least 10%, more preferably of at least 15%, very preferably at least 20%, and more particularly at least 25%.

The degree of branching can be determined by means, for example, of NMR analysis on the basis of model substances.

A polymer with an ideally branched structure, with no linear components, has a degree of branching of 100%; the polymers of the invention are obtainable preferably as branched or highly branched polymers, with a degree of branching of up to 99.9%, more preferably up to 99%, very preferably up to 98%, and more particularly up to 95%.

The polymers (Sz) are generally colorless to amber in color and dissolve well in solvents such as methanol, ethanol, dimethylformamide, dimethylacetamide, ethyl acetate, butyl acetate, tetrahydrofuran, acetone, 2-butanone or toluene.

In one preferred embodiment the carbonyl compounds are used substoichiometrically in relation to the compounds comprising acrylate groups, thus giving reaction mixtures which comprise the Baylis-Hillman product in a mixture with the acrylate employed. Mixtures of these kinds may be used with advantage in coating compositions for radiation curing and/or dual-cure curing.

Compounds (C) carrying thiol groups

The compound (C), in accordance with the invention, has at least two mercapto groups, preferably two to 20, more preferably two to 15, very preferably two to twelve, more particularly three to ten, and especially four to six.

Mercapto groups or thiol groups are understood in accordance with the invention to be —SH groups, particularly those which are bonded to tertiary carbon atoms, methine groups or methylene groups, more preferably those which are bonded to methylene groups.

Preferred compounds (C) possess a number-average molecular weight $M_n$ of at least 400 g/mol; generally speaking, the molecular weight $M_n$ ought not to exceed 5000 g/mol, preferably not more than 4500, more preferably not more than 4000, very preferably not more than 3500, and more particularly not more than 3000 g/mol.

Through the specified molecular weight it is possible to minimize the volatility and the typical odor of the mercapto compounds.

Compounds (C) of this kind are obtainable preferably by reaction of at least one ester of thiol group-carrying carboxylic acids with polyalcohols.

The compounds (C) are preferably compounds (C1) of the formula

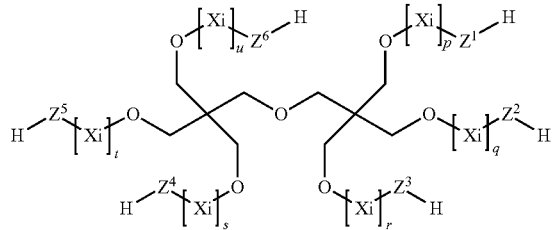

or compounds (C2) of the formula

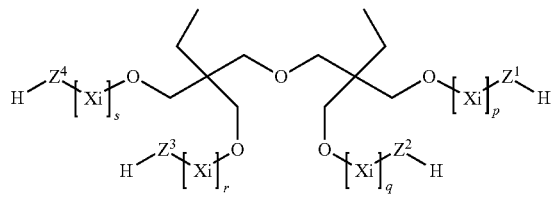

or compounds (C3) of the formula

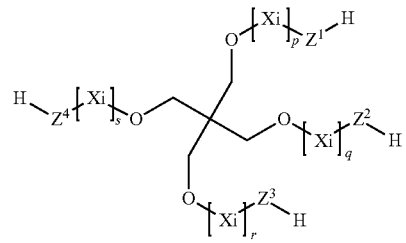

in which $Z^1$, $Z^2$, $Z^3$, $Z^4$, $Z^5$, and $Z^6$ are each independently of one another a sulfur atom or a radical of the formula —(C=O)—$R^3$—S—, $R^3$ is a divalent $C_1$- to $C_6$-alkylene radical, p, q, r, s, t, and u, in each case independently of one another, are zero or a positive integer from 1 to 5, preferably zero or a positive integer from 1 to 4, and more preferably zero or a positive integer from 1 to 3, and very preferably zero, each $X_i$ for i=1 to p, 1 to q, 1 to r, 1 to s, 1 to t, and 1 to u, independently of one another, may be selected from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$O—, —$CH_2$—CH($CH_3$)—O—, and —CH($CH_3$)—$CH_2$—O—, and more preferably —$CH_2$—$CH_2$—O— in which Ph is phenyl and Vin is vinyl, with the proviso that in the case of the compounds (C1) at least four, preferably at least five, and more preferably all six of the radicals $Z^1$ to $Z^6$ are a group of the formula —(C=O)—$R^3$—S— and, in the case of the compounds (C2) and (C3), at least three, preferably all four radicals $Z^1$ to $Z^4$ are a group of the formula —(C=O)—$R^3$—S—. The remaining radicals $Z^1$ to $Z^6$ or $Z^1$ to $Z^4$ then represent a single bond.

Examples of $R^3$ are methylene, 1,2-ethylene, 1,2-propylene, 1,3-propylene, 1,4-butylene, 1,5-pentylene, and 1,6-hexylene, preferably methylene, 1,2-ethylene, 1,3-propylene, 1,4-butylene, and 1,5-pentylene, more preferably methylene and 1,2-ethylene.

The compounds (C) may further be compounds (C4) with a functionality of two or three, of the formula

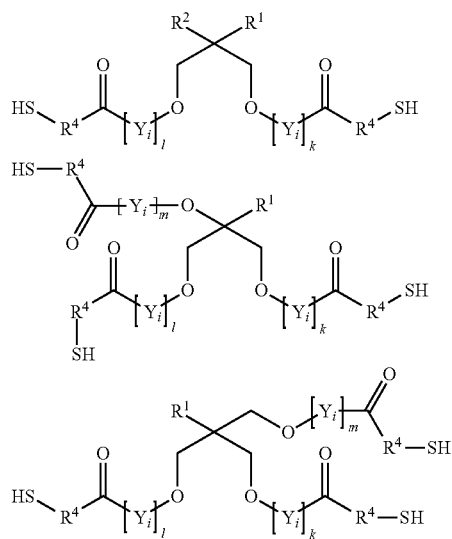

in which $R^1$ and $R^2$, each independently of one another, are hydrogen or a $C_1$- to $C_4$-alkyl radical, $R^4$ is methylene or 1,2-ethylene, k, l, m, and n, in each case independently of one another, are zero or a positive integer from 1 to 5, preferably zero or a positive integer from 1 to 4, and more preferably zero or a positive integer from 1 to 3, each $Y_i$ for I=1 to k, 1 to l, 1 to m, and 1 to n, independently of one another, may be selected from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$—O—, —$CH_2$—CH($CH_3$)—O—, and —CH($CH_3$)—$CH_2$—O—, and more preferably —$CH_2$—$CH_2$—O—, and in which Ph is phenyl and Vin is vinyl.

Particularly preferred di- or trimercapto compounds (C4) are the esterification products of 3-mercaptopropionic acid or mercaptoacetic acid with diols or triols, the diols or triols being selected from the group consisting of ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, 1,2-, 1,3- or 1,4-butanediol, 1,6-hexanediol, 1,10-decanediol, tetramethylcyclobutanediol, 1,2-, 1,3- or 1,4-cyclohexanediol, 2-ethyl-1,3-hexanediol, 2,4-diethyloctane-1,3-diol, 2,2-bis(4-hydroxycyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, glycerol, and also their alkoxylated, as for example ethoxylated and/or propoxylated, preferably ethoxylated products.

The di- or trifunctional compounds (C4) are preferably esterification products of 3-mercaptopropionic acid or mercaptoacetic acid with polyethylene glycol with a molar mass of 106 to 2000, polypropylene glycol with a molar mass of 134 to 2500, polyTHF with a molar mass of 162 to 2000, optionally ethoxylated trimethylolpropane with a molar mass of 134 to 1500, and optionally ethoxylated glycerol with a molar mass of 92 to 1100.

With particular preference the di- or trifunctional compounds (C4) are 3-mercaptopropionic esters based on polypropylene glycol with a molar mass of 2200 (PPGMP 2200), 3-mercaptopropionic esters based on polypropylene glycol with a molar mass of 800 (PPGMP 800), ethoxylated trimethylolpropane tri(3-mercaptopropionate) 1300 (ETTMP 1300), ethoxylated trimethylolpropane tri(3-mercaptopropionate) 700 (ETTMP 700), trimethylolpropane trimercaptoacetate (TMPMA), glycol di(3-mercaptopropionate) (GDMP), and trimethylolpropane tri(3-mercaptopropionate) (TMPMP).

Preferred such compounds having two or three mercapto groups are selected from the group consisting of ethylene glycol di(3-mercaptopropionate) (GDMP), trimethylolpropane tri(3-mercaptopropionate) (TMPMP), trimethylolpropane trimercaptoacetate (TMPMA), 3-mercaptopropionic ester of poly-1,2-propylene glycol with a molar mass of 500 to 2500 g/mol or 3-mercaptopropionic ester of ethoxylated trimethylolpropane with a molar mass of up to 1500 g/mol.

Examples of compounds (C1) to (C3) having a higher functionality are pentaerythritol tetra(3-mercaptopropionate) (PETMP), pentaerythrtol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and their alkoxylated, as for example ethoxylated and/or propoxylated, preferably ethoxylated products.

Preferred compounds (C1) to (C3) are pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate; particularly preferred are pentaerythritol tetra(3-mercaptopropionate) (PETMP), pentaerythritol tetramercaptoacetate (PETMA), dipentaerythritol hexa(3-mercaptopropionate), dipentaerythritol hexamercaptoacetate, ditrimethylolpropane tetra (3-mercaptopropionate), ditrimethylolpropane tetramercaptoacetate; and very particular preference is given to pentaerythritol tetra(3-mercaptopropionate) (PETMP) and pentaerythritol tetramercaptoacetate (PETMA).

The coating compositions of the invention may optionally comprise at least one reactive diluent (D) with a number-average molecular weight $M_n$ of less than 1000, preferably less than 750, and more preferably less than 500 g/mol, having at least two (meth)acrylate groups.

The at least one, preferably one to four, more preferably one to three, very preferably one to two, and especially preferably precisely one radiation-curable compound (D) having at least 2 acryloyl or methacryloyl groups, preferably two to ten, more preferably two to six, very preferably three to four acryloyl or methacryloyl groups, preferably acryloyl groups, comprises preferably (meth)acrylic esters of polyols, preferably alkoxylated polyols.

Examples of (meth)acrylic esters of polyols are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1.1-, 1,2-, 1,3-, and 1,4-cyclohexanedimethanol diacrylate, 1,2-, 1,3-, or 1,4-cyclohexanediol diacrylate, trimethylolpropane triacrylate, ditrimethylolpropane pentaacrylate or hexaacrylate, pentaerythritol triacrylate or tetraacrylate, glycerol diacrylate or triacrylate, and also diacrylates and polyacrylates of sugar alcohols, such as, for example, sorbitol, mannitol, diglycerol, threitol, erythritol, adonitol (ribitol), arabitol (lyxitol), xylitol, dulcitol (galactitol), maltitol, or isomalt.

Preferred (meth)acrylates are those of compounds of the formula (VIIa) to (VIId).

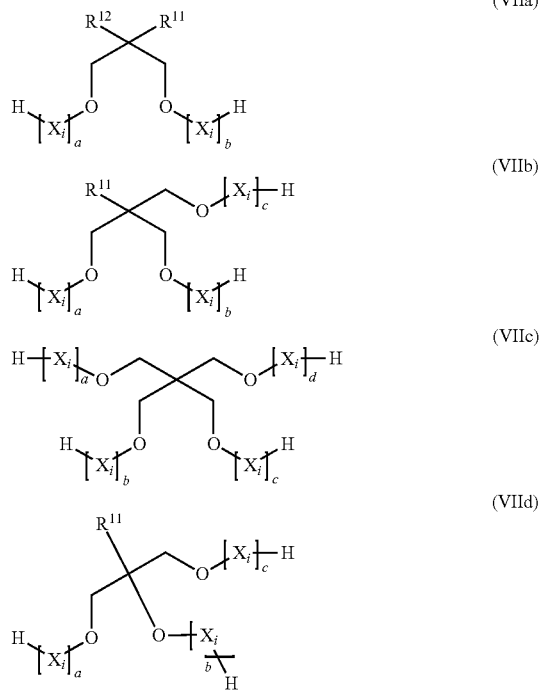

in which
$R^{11}$ and $R^{12}$ independently of one another are hydrogen or are $C_1$-$C_{18}$-alkyl optionally substituted by aryl, alkyl, aryloxy, alkyloxy, heteroatoms and/or heterocycles, a, b, c, and d independently of one another are each an integer from 1 to 10, preferably 1 to 5, and more preferably 1 to 3, and each $X_i$ for i=1 to a, 1 to b, 1 to c, and 1 to d, independently of one another, may be selected from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$—O—, —$CH_2$—CH($CH_3$)—O—, and —CH($CH_3$)—$CH_2$—O—, and more preferably —$CH_2$—$CH_2$—O— in which Ph is phenyl and Vin is vinyl.

In these definitions, $C_1$-$C_{18}$-alkyl optionally substituted by aryl, alkyl, aryloxy, alkyloxy, heteroatoms and/or heterocycles is for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, preferably methyl, ethyl or n-propyl, very preferably methyl or ethyl.

Particular preference in this context is given to (meth)acrylates of un- or singly to hexuply ethoxylated, propoxylated, or mixedly ethoxylated and propoxylated, and more particularly exclusively ethoxylated, glycerol, trimethylolpropane, ditrimethylolpropane, trimethylolethane, pentaerythritol or dipentaerythritol.

Very preferable are trimethylolpropane triacrylate, pentaerythritol tetraacrylate, and acrylates of singly to hexuply alkoxylated, more preferably ethoxylated, trimethylolpropane, ditrimethylolpropane, glycerol, pentaerythritol or dipentaerythritol.

The compounds (D) may further be ethylene glycol diacrylate, 1,2-propanediol diacrylate, dipropylene glycol diacrylate, tripropylene glycol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3- and 1,4-cyclohexanedimethanol diacrylate, 1,2-, 1,3- or 1,4-cyclohexanediol diacrylate.

The coating compositions of the invention are preferably made up as follows:
(S) 30 to 80, preferably 40 to 75 wt %,
(C) 20 to 70, preferably 25 to 60 wt %,
(D) 0 to 50, preferably 5 to 30 wt %, and
(F) 0 to 10, preferably 0.5 to 8 wt %
with the proviso that the sum total always makes 100 wt % and the stoichiometry of thiol groups in (C) to acrylate groups in (S) is from 0.2:1 to 3.8:1, preferably 0.8:1 to 2.5:1.

To accelerate the addition of the thiol groups of the compound (C) onto the acrylate groups of component (S), there is preferably at least one catalyst (E2) present in the coating composition.

Catalysts (E2) used for accelerating the addition reaction in the coating composition may be primary, secondary, and tertiary amines and also quaternary ammonium salts, imines or iminium salts. They may be aliphatic or aromatic, preferably aliphatic.

Preferred are tertiary amine, as for example trimethylamine, triethylamine, tri-n-butylamine, ethyldiisopropylamine, methyldiisopropylamine, N-methylmorpholine, N-methylpiperidine, triethanolamine, N,N-dimethylethanolamine, N-methyldicyclohexylamine, dimethylcyclohexylamine, diethylcyclohexylamine, methyldicyclohexylamine, ethyldicyclohexylamine, 4-N,N-dimethylaminopyridine, 1,5-diazabicyclo[4.3.0]-non-5-ene (DBN), 1,8-diazabicyclo [5.4.0]-undec-7-ene (DBU), tetramethylguanidine, pyrrocoline, quinuclidine, 3-hydroxyquinuclidine, quinidine, preferably 1,4-diazabicyclo[2,2,2]octane (DABCO), 1,5-diazabicyclo[4.3.0]-non-5-ene (DBN), 1,8-diazabicyclo [5.4.0]-undec-7-ene (DBU), N-methyldicyclohexylamine, quinuclidine, 3-aminoquinuclidine, and 3-hydroxyquinuclidine, more preferably N-methyldicyclohexylamine, 3-aminoquinuclidine, and 3-hydroxyquinuclidine.

The catalyst is used generally in amounts from 0.1 to 15 wt % in relation to the sum total of (S) and (C), preferably 0.2-10, more preferably 0.5-8, and very preferably 1 to 5 wt %.

The coating compositions for curing may further optionally comprise at least one photoinitiator (F) and/or, optionally, further additives typical for the respective coating.

Photoinitiators (F) may be, for example, photoinitiators known to the skilled person, examples being those specified in "Advances in Polymer Science", Volume 14, Springer Berlin 1974 or in K. K. Diettiker, Chemistry and Technology of UV and EB Formulation for Coatings, Inks and Paints, Volume 3; Photoinitiators for Free Radical and Cationic Polymerization, P. K. T. Oldring (Eds), SITA Technology Ltd, London.

Suitability is possessed, for example, by mono- or bisacylphosphine oxides, as described for example in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO from BASF SE), ethyl 2,4,6-trimethylbenzoylphenylphosphinate (Lucirin® TPO L from BASF SE), bis(2,4,6-trimethylbenzoyl)phenylphosphine oxide (Irgacure® 819 from BASF SE), benzophenones, hydroxyacetophenones, phenylglyoxylic acid and its derivatives, or mixtures of these photoinitiators. Examples that may be mentioned include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de] anthracene-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, 2-amylanthraquinone, and 2,3-butanedione.

Also suitable are nonyellowing or low-yellowing photoinitiators of the phenylglyoxalic ester type, as described in DE-A 198 26 712. DE-A 199 13 353 or WO 98/33761.

Preference among these photoinitiators is given to 2,4,6-trimethylbenzoyldiphenylphosphine oxide, ethyl 2,4,6-trimethylbenzoylphenylphosphinate, bis(2,4,6-tri-methylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

As further typical additives it is possible for example to use antioxidants, stabilizers, activators (accelerants), fillers, pigments, dyes, antistats, flame retardants, thickeners, thixotropic agents, surface-active agents, viscosity modifiers, plasticizers or chelating agents.

It is additionally possible to add one or more thermally activatable initiators, e.g., potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and, for example, those thermally activatable initiators which have a half-life of more than 100 hours at 80° C., such as di-tert-butyl peroxide, cumene hydroperoxide, dicumyl peroxide, tert-butyl perbenzoate, silylated pinacols, which are available commercially, for example, under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Other examples of suitable initiators are described in "Polymer Handbook", 2nd edn., Wiley & Sons, New York.

Suitable thickeners include not only free-radically (co) polymerized (co)polymers but also customary organic and inorganic thickeners such as hydroxymethylcellulose or bentonite.

As chelating agents it is possible, for example, to use ethylenediamineacetic acid and its salts, and also β-diketones.

Suitable fillers include silicates, examples being silicates obtainable by hydrolysis of silicon tetrachloride, such as Aerosil® from Degussa, siliceous earth, talc, aluminum silicates, magnesium silicates, calcium carbonates, etc.

Suitable stabilizers comprise typical UV absorbers such as oxanilides, triazines, and benzotriazole (the latter obtainable as Tinuvin® grades from BASF SE), and benzophenones. They can be employed alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate. Stabilizers are used usually in amounts of 0.1 to 5.0 wt %, based on the solid components comprised in the preparation.

The coating compositions of the invention can be used for coating a variety of substrates, such as wood, wood veneer, paper, paperboard, cardboard, textile, leather, nonwoven, plastics surfaces, glass, ceramic, mineral building materials, and coated or uncoated metals, for example.

It is an advantage of the present invention that the coating compositions of the invention, in contrast to two-component epoxy resins, still cure even at ambient temperatures of not more than 5° C. even at not more than 0° C. and especially at not more than −4° C.

In a preferred embodiment, the coating compositions of the invention can be used as adhesives, preferably for the bonding of substrates to the same or different substrates.

Preference here is given to the bonding of metals, plastics, mineral building materials, wood, and glass, in the form of a structural adhesive. Preferred applications are bonding in the construction sector, as for example for repair, in the automobile segment or in aircraft construction, and also as a universal adhesive, for craft workers, for example.

Coating compositions of these kinds may be employed, furthermore, in particular in primers, surfacers, pigmented topcoat materials, and clearcoat materials in the fields of automotive refinish or the finishing of large vehicles. Coating materials of these kinds are particularly suitable for applications requiring a particularly high level of reliability in application, external weathering resistance, optical qualities, resistance to solvents, chemicals, and water, as in automotive refinish and the finishing of large vehicles.

The coating compositions of the invention are suitable for coating substrates such as wood, paper, textile, leather, nonwoven, plastics surfaces, glass, ceramic, mineral building materials, such as cement moldings and fiber-cement slabs, or coated or uncoated metals, preferably plastics or metals, particularly in the form of thin sheets, and with particular preference metals.

The coating compositions of the invention are suitable as or in exterior coatings, in other words in those applications involving exposure to daylight, preferably parts of buildings, interior coatings, and coatings on vehicles and aircraft. In particular the coating compositions of the invention are used as or in automotive clearcoat and topcoat materials. Further preferred fields of use are can coating and coil coating.

In one preferred embodiment, the coating compositions of the invention are suitable for inhibiting corrosion, owing to the excellent adhesion to ferrous metals, especially to steel, the excellent water resistance and temperature stability, and their stretchability.

The coating compositions of the invention are suitable, furthermore, as primers, surfacers, pigmented topcoat materials, and clearcoat materials in the sectors of industrial coating, wood coating, automotive finishing, especially OEM finishing, or decorative coating. The coating materials are especially suitable for applications requiring a particularly high level of reliability in application, outdoor weathering resistance, optical qualities, scratch resistance, solvent resistance and/or chemical resistance.

In particular the coating compositions of the invention are suitable for application in the construction segment such as, for example, for industrial floors, waterproofing membranes, sealants and repair adhesives, on account of their outstanding adhesion to cementitious materials, such as concrete, mortar, etc., and also to construction steel. On account of the specific chemical structure, the capacity of the coating system to cure rapidly to a tack-free state even at low temperature, and the combination of strength and stretch, the systems here are particularly suitable. Comparable, epoxy resin-based materials do not have all of these properties; comparable radically initiated acrylic-based systems generally have poorer adhesion and/or are more difficult to formulate and to employ.

The coating systems of the invention open up the possibility, for example, of use in the production of parking-level coatings which can be implemented even in the winter months, or else processing in refrigeration facilities that do not need to be switched off and heated for this application. As a result, work can take place much more closely to the application, more cost-effectively, and more energy-efficiently.

Besides components (S), (C), (D), and optionally (E) and (F), the composition of the invention may comprise additional, further components. These may be, among others, the following auxiliaries and additives:

Adhesion promoters, examples being epoxysilanes, anhydridosilanes, adducts of silanes with primary aminosilanes, ureidosilanes, aminosilanes, diaminosilanes, and also their analogues in the form of monomer or oligomer and urea-silanes; e.g. Dynasylan® AMEO, Dynasylan AMMO, Dynasylan DAMO-T, Dynasylan 1146, Dynasylan 1189, Silquest® A-Link 15, epoxy resins, alkyl titanates, titanium chelates, aromatic polyisocyanates, phenolic resins; which conform, for example, to the general formula:

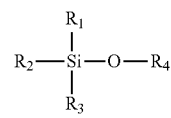

in which $R_1$, $R_2$ and $R_3$ independently of one another are halogen, amine, hydrogen, alkoxy, acyloxy, alkyl, aryl, aralkyloxy, alkylaryl or aralkyl groups and also alkyl group with olefinic groups, halides, amino, carbonyl, epoxy and glycidyloxy, ester, hydroxyimino, mercapto and sulfido, isocyanato, anhydrido, acryloyloxy, methacryloyloxy and vinyl groups, and also aryl group with olefinic groups, halides, amino, carbonyl, epoxy and glycidyloxy, ester, hydroxyimino, mercapto and sulfido, isocyanato, anhydrido, acryloyloxy, methacryloyloxy and vinyl groups, and also alkylaryl group with olefinic groups, halides, amino, carbonyl, epoxy and glycidyloxy, ester, hydroxyimino, mercapto and sulfido, isocyanato, anhydrido, acryloyloxy, methacryloyloxy and vinyl groups, and also aralkyl group with olefinic groups, halides, amino, carbonyl, epoxy and glycidyloxy, ester, hydroxyimino, mercapto and sulfido, isocyanato, anhydrido, acryloyloxy, methacryloyloxy, and vinyl groups, $R_4$ is alkyl and aryl.

Water scavengers, e.g. vinyltriethoxysilane, vinyltrimethoxysilane, α-functional silanes such as N-(silylmethyl)-O-methyl-carbamates, more particularly N-(methyldimethoxysilylmethyl)-O-methyl-carbamate, (methacryloyloxymethyl)silanes, methoxymethylsilanes, N-phenyl-, N-cyclohexyl- and N-alkylsilanes, orthoformic esters, calcium oxide or molecular sieve;

light stabilizers and aging inhibitors, which act in particular as stabilizers against heat, light and UV radiation, examples being phenolic antioxidants which function as free-radical scavengers, such as 2,6-di-tert-butyl-p-cresol, 2,6-di-tert-butylphenol, 2,4-dimethyl-6-tert-butylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), 5-tetrakis[methylene-3-(3,5-di-tert-butyl-4-hydroxyphenyl)propionate]methanes and 1,1,3-tris(2-methyl-4-hydroxy-5-tert-butylphenyl)butanes, and antioxidants based on amines (for example phenyl-β-naphthylamine, α-naphthylamine, N,N'-di-sec-butyl-p-phenylenediamine, phenothiazine and N,N'-diphenyl-p-phenylenediamines);

flame retardants, e.g. Al(OH)$_3$, huntite, brominated alkyl and aryl compounds;

biocides, such as, for example, algicides, fungicides or fungal growth inhibitor substances, e.g. Ag, $Ag^+$, compounds which give off $CH_2O$—;

fillers, e.g. ground or precipitated calcium carbonates, which optionally are coated with fatty acids or fatty acid mixtures, e.g. stearates, more particularly finely divided, coated calcium carbonate, carbon blacks, especially industrially manufactured carbon blacks, kaolins, aluminum oxides, silicas, more particularly highly disperse silica from pyrolysis processes, PVC powders or hollow beads. Preferred fillers are carbon black, calcium carbonates, such as precipitated or natural types of chalk such as Omya 5 GU, Omyalite 95 T, Omyacarb 90 T, Omyacarb 2 T-AV® from Omya, Ultra P-Flex from Specialty Minerals Inc, Socal® U1S2. Socal® 312, Winnofil® 312 from Solvay, Hakuenka® from Shiraishi, highly disperse silicas from pyrolysis processes, and combinations of these fillers. Likewise suitable are minerals such as siliceous earth, talc, calcium sulfate (gypsum) in the form of anhydrite, hemihydrate or dihydrate, finely ground quartz, silica gel, precipitated or natural barium sulfate, titanium dioxide, zeolites, leucite, potash feldspar, biotite, the group of soro-, cyclo-, ino-, phyllo- and hectosilicates, the group of low-solubility sulfates such as gypsum, anhydrite or heavy spar ($BaSO_4$), and also calcium minerals such as calcite, metals in powder form (aluminum, zinc or iron, for example), and barium sulfate;

rheology modifiers, such as thickeners, e.g. urea compounds and also monoamines, e.g. n-butylamine, methoxybutylamine and polyamide waxes, bentonites, silicones, polysiloxanes, hydrogenated castor oil, metal soaps, such as calcium stearate, aluminum stearate, barium stearate, precipitated silica, fumed silica and also poly(oxy-1,2-ethanediyl)-α-hydro-Ω-hydroxy polymer with oxy-1,2-ethanediyl-α-hydro-Ω-hydroxy-nonyl-phenoxyglycidyl ether oligomers and 5-isocyanato-1-(isocyanatomethyl)-1,3,3-trimethylcyclohexane or hydroxyethylcellulose or polyacrylic acid polymers and copolymers;

surface-active substances such as, for example, wetting agents, flow control agents, deaerating agents, defoamers and dispersants;

fibers, as for example of carbon, polyethylene or polypropylene, $SiO_2$, cellulose;

pigments, e.g. titanium dioxide;

solvents such as, for instance, water, solvent naphtha, methyl esters, aromatic hydrocarbons such as polyalkylbenzenes, toluene and xylene, solvents based on esters such as ethyl acetate, butyl acetate, allyl acetate and cellulose acetate, and solvents based on ketones such as methyl ethyl ketone, methyl isobutyl ketone and diisobutyl ketone, and also acetone, and mixtures of at least two of the aforementioned solvents;

and also further substances used in adhesives and sealants.

As further components the adhesives and sealants of the invention may comprise further plasticizers.

In one embodiment the adhesive or sealant of the invention comprises 1 to 80 wt % of fillers, 0 to 50 wt % of water and/or solvents, and 0 to 20 wt % of rheology modifiers. Preference is given to an amount of 30 to 55 wt % of fillers.

The present invention further provides for the use of the adhesive or sealant as a one- or two-component system for producing material bonds between parts to be joined. In the cured state the composition of the invention possesses a high mechanical strength in conjunction with high stretchability, and also good adhesion properties. Consequently it is suitable for a multiplicity of applications, more particularly as an elastic adhesive, as an elastic sealant or as an elastic coating. In particular it is suitable for applications which require rapid curing and impose exacting requirements on stretchability at the same time as exacting requirements on the adhesion properties and the strengths.

Suitable applications are, for example, the material bonds between parts to be joined made of concrete, mortar, glass, metal, ceramic, plastic and/or wood. In one particular embodiment the parts to be joined are firstly a surface and secondly a covering in the form of carpet, PVC, laminate, rubber, cork, linoleum, wood, e.g. woodblock flooring, floorboards, boat decks or tiles. The composition of the invention can be used in particular for the jointing of natural stone. Moreover, the adhesives and sealants of the invention can be used for the manufacture or repair of industrial goods or consumer goods, and also for the sealing or bonding of components in construction or civil engineering, and also, in particular, in the sanitary sector. The parts to be joined may especially be parts in automotive, trailer, truck, caravan, train, aircraft, watercraft and railroad construction.

An adhesive for elastic bonds in this sector is applied with preference in the form of a bead in a substantially round or triangular cross-sectional area. Elastic bonds in vehicle construction are, for example, the adhesive attachment of parts such as plastic covers, trim strips, flanges, fenders, driver's cabs or other components for installation, to the painted body of a means of transport, or the bonding of glazing into the body.

A preferred area of application in construction and civil engineering is that of construction joints, flooring joints, joints in accordance with the German Water Management Law, flashing joints, expansion joints or sealed joints in the sanitary sector. In one preferred embodiment the composition described is used as an elastic adhesive or sealant. In the form of an elastic adhesive, the composition typically has an elongation at break of at least 5%, and in the form of an elastic sealant it typically has an elongation at break of at least 300%, at room temperature.

For use of the composition as a sealant for joints, for example, in construction or civil engineering, or for use as an adhesive for elastic bonds in automotive construction, for example, the composition preferably has a paste-like consistency with properties of structural viscosity. A paste-like sealant or adhesive of this kind is applied by means of a suitable device to the part to be joined. Suitable methods of application are, for example, application from standard commercial cartridges, pouches or pouches inserted in cartridges, which are operated manually or by means of compressed air, or from a drum or hobbock by means of a conveying pump or an eccentric screw pump, optionally by means of an application robot.

The parts to be joined may where necessary be pretreated before the adhesive or sealant is applied. Such pretreatments include, in particular, physical and/or chemical cleaning processes, examples being abrading, sandblasting, brushing or the like, or treatment with cleaners or solvents, or the application of an adhesion promoter, an adhesion promoter solution or a primer.

In the context of its use as an adhesive, the composition of the invention is applied either to one or the other part to be joined, or to both parts to be joined. Thereafter the parts to be bonded are joined, and the adhesive cures. It must in each case be ensured that the joining of the parts takes place within what is referred to as the open time, in order to ensure that the two parts are reliably bonded to one another.

The present invention further provides a process for preparing an adhesive or sealant, where further components, more particularly from the series of fillers, thixotropic agents, antioxidants and UV absorbers, solvents and adhesion promoters, are introduced and mixed.

For the preparation process of the invention it is considered preferred that the components employed are mixed with one another and/or kept moving throughout the entire operation. Alternatively the components employed may also be mixed with one another only at the end of the preparation process. Suitable mixing equipment encompasses all of the apparatus known for this purpose to the skilled person, and more particularly may be a static mixer, planetary mixer, horizontal turbulent mixer (from Drais), planetary dissolver or dissolver (from PC Laborsysteme), intensive mixer and/or extruder.

The process of the invention for preparing the adhesive or sealant may be carried out discontinuously in, for example, a planetary mixer. It is, however, also possible to operate the process continuously, in which case extruders in particular have been found suitable for this purpose. In that case the binder is fed to the extruder, and liquid and solid adjuvants are metered in.

In one preferred embodiment, the coating compositions of the invention comprise up to 50 wt % of at least one pigment. Whereas in exclusively radiation-curable coating compositions, the pigments generally absorb at least some of the irradiated UV radiation, and so hinder or even prevent radiation curing, the coating compositions of the invention, with the addition reaction of the thiol groups onto the acrylate groups, possess a further curing mechanism, and provide cured coatings even where UV irradiation does not produce curing, or does not produce adequate curing.

Pigments, in accordance with the definition in DIN 55944, are finely divided, organic or inorganic colorants that are virtually insoluble in water. Preferably, for producing or formulating systems according to the invention, organic pigments are the starting point, including carbon black. Furthermore, white pigments are equally preferred, especially titanium dioxide. Examples of particularly well-suited pigments are specified below.

Organic pigments:
Monoazo pigments: C.I. Pigment Brown 25; C.I. Pigment Orange 5, 13, 36 and 67; C.I. Pigment Red 1,2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183;
Disazo pigments: C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188;
Anthanthrone pigments: C.I. Pigment Red 168 (C.I. Vat Orange 3);
Anthraquinone pigments: C.I. Pigment Yellow 147 and 177; C.I. Pigment Violet 31;
Anthrapyrimidine pigments: C.I. Pigment Yellow 108 (C.I. Vat Yellow 20);
Quinacridone pigments: C.I. Pigment Red 122, 202 and 206; C.I. Pigment Violet 19;
Quinophthalone pigments: C.I. Pigment Yellow 138;
Dioxazine pigments: C.I. Pigment Violet 23 and 37;
Flavanthrone pigments: C.I. Pigment Yellow 24 (C.I. Vat Yellow 1);
Indanthrone pigments: C.I. Pigment Blue 60 (C.I. Vat Blue 4) and 64 (C.I. Vat Blue 6);
Isoindoline pigments: C.I. Pigment Orange 69; C.I. Pigment Red 260; C.I. Pigment Yellow 139 and 185;
Isoindolinone pigments: C.I. Pigment Orange 61; C.I. Pigment Red 257 and 260; C.I. Pigment Yellow 109, 110, 173 and 185;
Isoviolanthrone pigments: C.I. Pigment Violet 31 (C.I. Vat Violet 1);
Metal complex pigments: C.I. Pigment Yellow 117, 150 and 153; C.I. Pigment Green 8;
Perinone pigments: C.I. Pigment Orange 43 (C.I. Vat Orange 7); C.I. Pigment Red 194 (C.I. Vat Red 15);
Perylene pigments: C.I. Pigment Black 31 and 32; C.I. Pigment Red 123, 149, 178, 179 (C.I. Vat Red 23), 190 (C.I. Vat Red 29) and 224; C.I. Pigment Violet 29;
Phthalocyanine pigments: C.I. Pigment Blue 15, 15:1, 15:2, 15:3, 15:4, 15:6 and 16; C.I. Pigment Green 7 and 36;
Pyranthrone pigments: C.I. Pigment Orange 51; C.I. Pigment Red 216 (C.I. Vat Orange 4);
Thioindigo pigments: C.I. Pigment Red 88 and 181 (C.I. Vat Red 1); C.I. Pigment Violet 38 (C.I. Vat Violet 3);
Triarylcarbonium pigments: C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black); C.I. Pigment Yellow 101 (aldazine yellow); C.I. Pigment Brown 22.

Inorganic pigments:
White pigments: titanium dioxide (C.I. Pigment White 6), zinc white, pigmented zinc oxide, barium sulfate, zinc sulfide, lithopones; lead white; calcium carbonate;
Black pigments: iron oxide black (C.I. Pigment Black 11), iron-manganese black, spinel black (C.I. Pigment Black 27); carbon black (C.I. Pigment Black 7);
Color pigments: chromium oxide, chromium oxide hydrate green; chromium green (C.I. Pigment Green 48); cobalt green (C.I. Pigment Green 50); ultramarine green; cobalt blue (C.I. Pigment Blue 28 and 36); ultramarine blue; iron blue (C.I. Pigment Blue 27); manganese blue; ultramarine violet; cobalt and manganese violet; iron oxide red (C.I. Pigment Red 101); cadmium sulfoselenide (C.I. Pigment Red 108); molybdate red (C.I. Pigment Red 104); ultramarine red;

Iron oxide brown, mixed brown, spinel and corundum phases (C.I. Pigment Brown 24, 29 and 31), chromium orange;

Iron oxide yellow (C.I. Pigment Yellow 42); nickel titanium yellow (C.I. Pigment Yellow 53; C.I. Pigment Yellow 157 and 164); chromium titanium yellow; cadmium sulfide and cadmium zinc sulfide (C.I., Pigment Yellow 37 and 35); chromium yellow (C.I. Pigment Yellow 34), zinc yellow, alkaline earth metal chromates; Naples yellow; bismuth vanadate (C.I. Pigment Yellow 184);
Interference pigments: metallic effect pigments based on coated metal platelets; pearlescent pigments based on metal oxide coated mica platelets; liquid crystal pigments.

Preferred pigments in this context are monoazo pigments (especially laked BONS pigments, Naphthol AS pigments), disazo pigments (especially diaryl yellow pigments, bisacetoacetanilide pigments, disazopyrazolone pigments), quinacridone pigments, quinophthalone pigments, perinone pigments, phthalocyanine pigments, triarylcarbonium pigments (alkali blue pigments, laked rhodamines, dye salts with complex anions), isoindoline pigments, white pigments, and carbon blacks.

Examples of particularly preferred pigments are specifically: carbon black, titanium dioxide, C.I. Pigment Yellow 138, C.I. Pigment Red 122 and 146, C.I. Pigment Violet 19, C.I. Pigment Blue 15:3 and 15:4, C.I. Pigment Black 7, C.I. Pigment Orange 5, 38 and 43, and C.I. Pigment Green 7.

In one particularly preferred embodiment, the coating compositions of the invention are used for the coating of porous substrates where irradiation is unable to penetrate the entire coating composition. Substrates in question are preferably mineral building materials, preferably concrete, mortar, molded cement blocks and fiber cement slabs, and also ferrous metals, especially steel.

Prior to application, the coating compositions of the invention are obtainable by the mixing at least of components (S) and (C), and also, optionally, of components (D) and/or (F), and also, optionally, further additives.

It may be sensible here to incorporate the optional components (D) and/or (F) and/or further additives into one of components (S) and (C) even prior to mixing, allowing them to be held as a masterbatch formulation. In this case, the production of the coating compositions of the invention becomes simply a matter of mixing two components.

It is also possible to mix all of the components, apart from the catalyst (E), with one another, and then to start curing by the addition and mixing-in of the catalyst (E).

After the components have been mixed and the catalyst (E) added, the coating composition generally has a pot life of up to 3 hours, preferably up to 2 hours, more preferably from 1 to 90 minutes, very preferably from 2 to 60 minutes, and more particularly from 5 to 45 minutes.

If the pot life of the coating composition is to be extended, then one or more stabilizers may be added to the coating composition, as described in WO 2012/126695.

Coating of the substrates with the coating compositions of the invention takes place in accordance with customary methods which are known to the skilled worker and involve applying a coating composition of the invention, or a coating formulation comprising it, to the target substrate in the desired thickness, and, if appropriate, drying it. This operation may if desired be repeated one or more times. Application to the substrate may take place in a known way, such as for example by spraying, troweling, knifecoating, brushing, rolling, roller coating, pouring, laminating, injection-backmolding or coextruding.

The coating thickness is generally in a range from about 3 to 1000 g/m$^2$ and preferably 10 to 200 g/m$^2$.

Additionally disclosed is a method of coating substrates which involves optionally adding further, typical coatings additives and thermally curable, chemically curable or radiation-curable resins to a coating composition of the invention or to a coating formulation comprising it, applying the resulting formulation to the substrate, drying it optionally, and curing it with electron beams or by UV exposure under an oxygen-containing atmosphere, preferably, or under inert gas, with thermal treatment optionally at temperatures up to the level of the drying temperature, and subsequently at temperatures up to 160° C., preferably between 60 and 160° C., more preferably between 100 and 180° C.

Radiation curing takes place with high-energy light, UV light for example, or electron beams. Radiation curing may take place at relatively high temperatures. Preference is given in this case to a temperature above the $T_g$ of the radiation-curable binder.

The coating materials may be applied one or more times by a very wide variety of spraying methods, such as compressed-air, airless or electrostatic spraying methods, using one- or two-component spraying units, or else by injecting, troweling, knifecoating, brushing, rolling, roller coating, pouring, laminating, injection-backmolding or coextruding.

Drying and curing of the coatings takes place in general under standard temperature conditions, i.e., without the coating being heated. However, the mixtures of the invention can also be used to produce coatings which, following application, are dried and cured at an elevated temperature, e.g., at 40-250° C., preferably 40-150° C., and in particular at 40 to 100° C. This is limited by the thermal stability of the substrate.

Additionally disclosed is a method of coating substrates which involves optionally adding thermally curable resins to the coating composition of the invention or coating formulations comprising it, applying the resulting formulation to the substrate, drying it, and then curing it with electron beams or UV exposure under an oxygen-containing atmosphere, preferably, or under inert gas, optionally at temperatures up to the level of the drying temperature.

The method of coating substrates can also be practiced by irradiating the applied coating composition of the invention or coating formulations of the invention first with electron beams or by UV exposure under oxygen or, preferably, under inert gas, in order to obtain preliminary curing, then carrying out thermal treatment at temperatures up to 160° C., preferably between 60 and 160° C., and subsequently completing curing with electron beams or by UV exposure under oxygen, preferably, or under inert gas.

Optionally, if a plurality of layers of the coating material are applied one on top of another, drying and/or radiation curing may take place after each coating operation.

Examples of suitable radiation sources for the radiation curing are low-pressure mercury lamps, medium-pressure mercury lamps with high-pressure lamps, and fluorescent tubes, pulsed lamps, metal halide lamps, electronic flash units, with the result that radiation curing is possible without a photoinitiator, or excimer lamps. The radiation curing is accomplished by exposure to high-energy radiation, i.e., UV radiation, or daylight, preferably light in the wavelength range of $\lambda$=200 to 700 nm, more preferably $\lambda$=200 to 500 nm, and very preferably $\lambda$=250 to 400 nm, or by exposure to high-energy electrons (electron beams; 150 to 300 keV). Examples of radiation sources used include high-pressure mercury vapor lamps, lasers, pulsed lamps (flash light), LED lamps, halogen lamps or excimer lamps. The radiation dose normally sufficient for crosslinking in the case of UV curing is in the range from 80 to 3000 mJ/cm$^2$.

It will be appreciated that a number of radiation sources can also be used for the curing: two to four, for example.

These sources may also emit each in different wavelength ranges.

Drying and/or thermal treatment may also take place, in addition to or instead of the thermal treatment, by means of NIR radiation, which here refers to electromagnetic radiation in the wavelength range from 760 nm to 2.5 µm, preferably from 900 to 1500 nm.

Irradiation can optionally also be carried out in the absence of oxygen, such as under an inert gas atmosphere. Suitable inert gases are preferably nitrogen, noble gases, carbon dioxide, or combustion gases. Furthermore, irradiation may take place by covering the coating composition with transparent media. Examples of transparent media include polymeric films, glass or liquids, water for example. Particular preference is given to irradiation in the manner described in DE-A1 199 57 900.

It is an advantage of the coating compositions of the invention that even on curing under an oxygen-containing atmosphere they produce coating properties whose quality is similar to that when curing takes place under an inert atmosphere.

ppm and percentage figures used in this specification are by weight unless otherwise indicated.

The examples below are intended to illustrate the invention but not to limit it to these examples.

EXAMPLES

Preparation of Inventive Products S

Adduct (A): An oligomeric adduct (Sz type) of 1,4-butanediol diacrylate (Laromer® BDDA, BASF SE) and terephthalaldehyde:

DABCO (0.075 mol; 8.413 g) was added to a suspension of 1,4-butanediol diacrylate (1.800 mol; 356.788 g) and terephthalaldehyde (1.500 mol; 201.198 g) in tetrahydrofuran (THF, 300 mL). The resulting mixture was stirred at 60° C. for 48 hours. After that time, THF was removed under a low vacuum. The remaining mixture was taken up in ethyl acetate and washed with 10% strength HCl in order to remove residues of the catalyst. The organic fraction was then dried over magnesium sulfate ($MgSO_4$) and filtered, and the solvent was removed under reduced pressure. For further purification, the mixture was treated at 80° C. and 1 mbar for 12 hours.

Gel permeation chromatography (GPC) in THF with PMMA standard gave an $M_w$ of 1100 g/mol and an $M_n$ of 910 g/mol. The product was a clear, yellow-colored, viscous liquid.

Further possibilities employed successfully for removal or deactivation of the catalyst were filtration of the reaction mixture over solid polyacrylic acid (e.g., SOKALAN® products, BASF SE), or neutralization of the catalyst with an acid, such as benzoic acid or toluenesulfonic acid, for example.

A further alternative possibility was the use of the phosphine catalyst diphenylmethylphosphine (0.075 mol).

Adduct (B): Adduct (S2 type) of benzaldehyde and Laromer® BDDA:

3-Hydroxyquinuclidine (0.125 mol, 15.898 g) was added to a mixture consisting of 1,4-butanediol diacrylate (1.000 mol, 198.216 g) and benzaldehyde (1.000 mol, 106.122 g) and the mixture was stirred at 50° C. for 24 hours. Then diethyl ether was added and the organic phase was washed first with 10% strength aqueous HCl and then with saturated sodium hydrogensulfate ($NaHSO_3$) solution. The organic fraction was subsequently dried over $MgSO_4$ and filtered, and the solvent was removed under reduced pressure. The product was obtained as a clear liquid.

Adduct (C): Adduct (S1 type) of benzaldehyde with ethyl acrylate:

3-Hydroxyquinuclidine (0.050 mol, 6.359 g) was added to a mixture consisting of ethyl acrylate (1.000 mol, 100.116 g), benzaldehyde (1.000 mol, 106.122 g), and ethanol (10 ml) and the mixture was stirred at 50° C. for 72 hours. Then diethyl ether was added and the organic phase was washed first with 10% strength aqueous HCl and then with saturated $NaHSO_3$ solution. The organic fraction was subsequently dried over $MgSO_4$ and filtered, and the solvent was removed under reduced pressure. The product was obtained as a clear liquid.

Adduct (D): An oligomeric adduct (Sz type) of neopentyl glycol diacrylate with terephthalaldehyde:

3-Hydroxyquinuclidine (0.005 mol; 0.636 g) was added to a suspension of neopentyl glycol diacrylate (0.110 mol; 23.346 g) and terephthalaldehyde (0.100 mol; 13.413 g) in THF (300 mL) and the resulting mixture was stirred at 60° C. for 48 hours. Following the removal of the solvent, the residue was taken up in dichloromethane and the organic phase was washed first with 10% strength aqueous HCl, then with saturated $NaHSO_3$ solution. The organic fraction was then dried over $MgSO_4$ and filtered, and the solvent was removed under reduced pressure. For further purification, the mixture was treated at 80° C. and 1 mbar for 12 hours.

GPC in THF with PMMA standards gave an $M_w$ of 640 g/mol and an $M_n$ of 570 g/mol. The product was a clear, yellow-colored, viscous liquid.

Adduct (E): Preparation of the adduct (S2 type) from pentaerythritol triacrylate and benzaldehyde:

100.0 g (0.335 mol) of pentaerythritol triacrylate were mixed with 106.7 g of benzaldehyde (1.0 mol) and 3.37 g of DABCO (30 mmol) and the mixture was stirred at 60° C. for 48 hours. The mixture was then taken up in THF and the catalyst was removed by filtration over solid polyacrylic acid (SOKALAN® PA 40, BASF SE). THF was then removed under reduced pressure. The resulting product was a clear liquid.

Adduct (F): Preparation of the adduct (S2 type) from dipentaerythritol penta-/hexaacrylate and benzaldehyde:

17.9 g (0.060 mol) of dipentaerythritol penta-/hexaacrylate were mixed with 19.1 g of benzaldehyde (0.180 mol) and 0.760 g of 3-HQD (6.00 mmol of hydroxyquinuclidine) and the mixture was stirred at 60° C. for 96 hours. The catalyst was then removed by neutralization with benzoic acid. The resulting product was a clear liquid.

Curing of adducts S: Examples of different formulations

All of the formulations indicated were cured at room temperature and are based on the above-prepared adducts (A) to (F). Higher temperatures during curing are possible, leading to more rapid curing and to materials having an ultimate hardness which is higher by approximately 20%.

Example 1: Formulation of a Two-Component System as Structural Adhesive 9 g of adduct (A)=component 1

10.4 g of pentaerythritol tetrakis(3-mercaptopropionate) (crosslinker) mixed with 80 mg of N-methyldicyclohexylamine (catalyst)=component 2

Component 1 was mixed with component 2. After 2 hours of curing at room temperature, the system had a Shore A hardness of 76 and after curing for 14 days it had a Shore D hardness of 70. A tensile test on the cured material after 14 days gave a tensile strength of 10.1 $N/mm^2$ with an elongation of 10-40%. The test specimens measured were dumbbell specimens to ISO 527. ASTM D 638, in the Z 250 SN (AllroundLine) instrument.

Tensile shear tests on the cured resin after 1 week of storage at room temperature on various substrates gave the following tensile adhesive strengths:

Polypropylene/polypropylene: 0.5 $N/mm^2$

Glass/glass: 1.3 $N/mm^2$

Aluminum/aluminum: 1.5 $N/mm^2$

Wood/wood: 2.5 $N/mm^2$

Steel/steel: 5.5 $N/mm^2$

Concrete/concrete: >3.5 $N/mm^2$ (concrete broke cohesively)

Measurement took place with the Z 250 SN (AllroundLine) instrument, pretensioning force=2 N, test speed=0.5 mm/min, bond area 360 mm.

A further particular feature of this adhesive formulation is that it was curable to a tack-free state at −4'C.

Comparative experiments with epoxy resin-based systems of the prior art (UHU Endfest 3000 (from UHU) and Sikadur® 31 CF Baukieber (construction adhesive from SIKA) showed that it is not possible to cure these conventional systems below 0° C.

Example 2: Formulation with Reactive Diluent 4.5 g of adduct (A) and 4.5 g of Laromer® BDDA (1,4-butanediol diacrylate, reactive diluent)=component 1

10.4 g of pentaerythritol tetrakis(3-mercaptopropionate) (crosslinker) and 80 mg of N-methyldicyclohexylamine (catalyst)=component 2

Component 1 was mixed with component 2. After 5 hours of curing at room temperature, the material had a Shore A hardness of 61. The material described here is somewhat softer than the formulation of example 1, but the system is substantially more fluid and can be filled to a higher level with aggregates, which is advantageous, for example, for use as a leveling compound in the construction sector.

Example 3: Formulation of a Filled System 4.5 g of adduct (A), 4.5 g of Laromer® BDDA (1,4-butanediol diacrylate, reactive diluent), 19.4 g of calcium carbonate ($CaCO_3$) powder (filler), Tego Airex® 940 defoamer=component 1

10.4 g of pentaerythritol tetrakis(3-mercaptopropionate) (crosslinker) mixed with 80 mg of N-methyldicyclohexylamine (catalyst)=component 2

Component 1 was mixed with component 2. After 5 hours of curing at room temperature, the material had a Shore A hardness of 85 (60 Shore D).

Example 4: Formulation of a Soft Material (for Example, for Sealants, Waterproofing Membranes, Fuel-Resistant Coatings)

5 g of adduct (A)=component 1

15 g of Thioplast® G44 polysulfide from AkzoNobel (polysulfide-based crosslinker) with 110 mg of N-methyldicyclohexylamine (catalyst)=component 2.

Component 1 was mixed with component 2. After 16 hours of curing at room temperature, the material had a Shore A hardness of 46.

Example 5: Curing of an Oligomeric Adduct Based on Neopentyl Glycol Diacrylate 9 g of adduct (D)=component 1

10 g of pentaerythritol tetrakis(3-mercaptopropionate) (crosslinker) with 240 mg of N-methyldicyclohexylamine (catalyst)=component 2.

Component 1 was mixed with component 2. After 2 hours of curing at room temperature, the material had a Shore A hardness of 80 (57 Shore D).

Example 6: Curing of a Monomeric Adduct 7.3 g of adduct (B)=component 1

5.5 g of pentaerythritol tetrakis(3-mercaptoproplonate) (crosslinker) with 50 mg of N-methyldicyclohexylamine (catalyst)=component 2.

Component 1 was mixed with component 2. After 2 days of curing at room temperature, the material had a Shore A hardness of 59.

Example 7: Formulation of a Transparent, Silica-Based Hybrid Material 6 g of adduct (B), 6 g of pentaerythritol triacrylate (reactive diluent, network former), and 0.5 g of water=component 1

14.4 g of pentaerythritol tetrakis(3-mercaptopropionate) (crosslinker), 4 g of mercaptopropyltriethoxysilane, 50 mg of N-methyldicyclohexylamine (catalyst) and 120 mg of TEGO Airex® 940 (deaerating agent)=component 2

Component 1 was mixed with component 2. After 1 day of curing at room temperature, the hybrid material had a Shore A hardness of 71. The material was clear and transparent.

Example 8: Curing of a Monomeric Adduct Based on Dipentaerythritol Penta-/Hexaacrylate 9.02 g of adduct (F)=component 1

10.53 g of pentaerythritol tetrakis(3-mercaptopropionate) (crosslinker)

with 200 mg of N-methyldicyclohexylamine (catalyst)= component 2

Component 1 was mixed with component 2.

After 2 days of curing at 60° C., the material had a shore A hardness of 50.

Example 9: Comparative Experiment of an Inventive System with a Prior-Art, Acrylate-Based System; Both Systems Cured with Thiol The comparative system according to the prior art selected was pentaerythritol triacrylate as acrylate component, since this molecule can be cured to give solid materials. Moreover, it permits comparison with an inventive adduct having the same number of double bonds and hence the same SH to C=C ratio in the formulation. Accordingly, the adhesive force of the materials can be compared directly.
(X)=adduct (E)
(Y)=pentaerythritol triacrylate
(X) and also (Y) were crosslinked with pentaerythritol tetrakis(3-mercaptopropionate) with an SH/C=C ratio of 0.94, and a determination was made, for the purpose of example, of the adhesion to steel. Tensile adhesion anchors were pulled in accordance with DIN EN 13596, and determinations were made of the maximum tensile adhesion strains.
After 1 day of curing at room temperature:
(X) based resin: 0.270 $N/mm^2$ (average of 6 measurements)
(Y) based resin: 0.181 $N/mm^2$ (average of 6 measurements)
After 14 days of curing at room temperature:
(X) based resin: 0.297 $N/mm^2$ (average of 3 measurements)
(Y) based resin: 0.166 $N/mm^2$ (average of 3 measurements)
As a result, the use of the inventive system in the addition-crosslinking systems described leads to significantly higher adhesion properties as compared with the acrylate system according to the prior art.

The invention claimed is:
1. A coating composition comprising
at least one compound (S) having at least two α-(1'-hydroxyalkyl)acrylate groups,
optionally at least one compound (S1) having one α-(1'-hydroxyalkyl)acrylate group, at least one compound (C) which carries at least two thiol groups, optionally at least one reactive diluent (D) having a number-average molecular weight $M_n$ of less than 1000 g/mol and having at least two (meth)acrylate groups, optionally at least one catalyst (E) which is able to accelerate the addition of thiol groups onto acrylate groups, and optionally at least one photoinitiator (F).

2. The coating composition according to claim 1, wherein compound (S) comprises at least one compound (S2) obtained by reaction of a polyfunctional acrylate (IV) with a monofunctional carbonyl compound (II) to form compound (V)

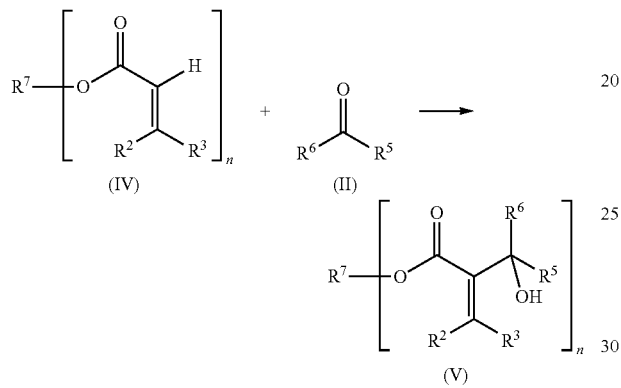

or by reaction of a monofunctional acrylate (I) with a carbonyl compound (VI) having a functionality of two or more to form compound (VII)

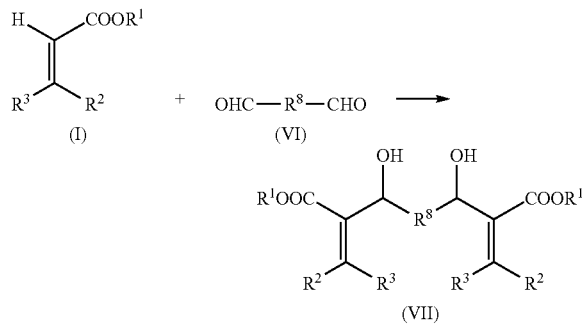

in which $R^1$, $R^2$, and $R^3$ independently of one another are $C_1$-$C_{18}$-alkyl, $C_2$-$C_{18}$-alkyl, $C_2$-$C_{18}$-alkenyl, $C_6$-$C_{12}$-aryl, $C_5$-$C_{12}$-cycloalkyl, or a five- to six-membered heterocycle with oxygen, nitrogen and/or sulfur atoms, wherein $C_2$-$C_{18}$-alkyl is optionally interrupted by one or more oxygen atoms and/or sulfur atoms and/or by one or more substituted or unsubstituted imino groups, wherein $C_1$-$C_{18}$-alkyl, $C_2$-$C_{18}$-alkenyl, $C_6$-$C_{12}$-aryl, $C_5$-$C_{12}$-cycloalkyl are optionally substituted in each case by aryl, alkyl, aryloxy, alkyloxy, heteroatoms and/or heterocycles, $R^2$ and/or $R^3$ additionally are hydrogen, $C_1$-$C_{18}$-alkoxy optionally substituted by aryl, alkyl, aryloxy, alkyloxy, heteroatoms and/or heterocycles, or —COOR$^4$, $R^2$ may additionally, together with $R^1$, form a ring, in which $R^2$ is a carbonyl group, wherein the group COOR$^1$ and $R^2$ together form an acid anhydride group —(CO)—O—(CO)—, $R^4$ has the same definition as listed for $R^1$, but may be different from $R^1$, $R^5$ and $R^6$ independently of one another are hydrogen, $C_1$-$C_{18}$-alkyl, $C_2$-$C_{18}$-alkyl, $C_2$-$C_{18}$-alkenyl, $C_6$-$C_{12}$-aryl, $C_5$-$C_{12}$-cycloalkyl, a five- to six-membered heterocycle with oxygen, nitrogen and/or sulfur atoms, or together form a ring, wherein $C_2$-$C_{18}$-alkyl is optionally interrupted by one or more oxygen atoms and/or sulfur atoms and/or by one or more substituted or unsubstituted imino groups, wherein $C_1$-$C_{18}$-alkyl, $C_2$-$C_{18}$-alkenyl, $C_6$-$C_{12}$-aryl, $C_5$-$C_{12}$-cycloalkyl are optionally substituted in each case by aryl, alkyl, aryloxy, alkyloxy, heteroatoms and/or heterocycles, n is a positive integer from 2 to 10, $R^7$ is an n-valent organic radical having 1 to 50 carbon atoms, which are unsubstituted or substituted by halogen, $C_1$-$C_8$-alkyl, $C_2$-$C_8$-alkenyl, carboxyl, carboxy-$C_1$-$C_8$-alkyl, $C_1$-$C_{20}$-acyl, $C_1$-$C_8$-alkoxy, $C_6$-$C_{12}$-aryl, hydroxyl or hydroxyl-substituted $C_1$-$C_8$-alkyl, and/or have one or more —(CO)—, —O(CO)O—, —(NH)(CO)O—, —O(CO)(NH)—, —O(CO)—, or —(CO)O— groups, and $R^8$ is $C_6$-$C_{12}$-arylene, $C_3$-$C_{12}$-cycloalkylene, $C_1$-$C_{20}$-alkylene, $C_2$-$C_{20}$-alkylene, or a single bond, wherein $R^8$ is unsubstituted or substituted by halogen, $C_1$-$C_8$-alkyl, $C_2$-$C_8$-alkenyl, carboxyl, carboxy-$C_1$-$C_8$-alkyl, $C_1$-$C_{20}$-acyl, $C_1$-$C_8$-alkoxy, $C_6$-$C_{12}$-aryl, hydroxyl or hydroxyl-substituted $C_1$-$C_8$-alkyl, wherein $C_2$-$C_{20}$-alkylene is interrupted by one or more oxygen atoms and/or sulfur atoms and/or by one or more substituted or unsubstituted imino groups and/or by one or more —(CO)—, —O(CO)O—, —(NH)(CO)O—, —O(CO)(NH)—, —O(CO)—, or —(CO)O— groups.

3. The coating composition according to claim 2, wherein compound (IV) is selected from the group consisting of ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-cyclohexanedimethanol diacrylate, 1,2-cyclohexanedimethanol diacrylate, 1,3-cyclohexanedimethanol diacrylate, 1,4-cyclohexanedimethanol diacrylate, 1,2-cyclohexanediol diacrylate, 1,3-cyclohexanediol diacrylate, 1,4-cyclohexanediol diacrylate, trimethylolpropane triacrylate, ditrimethylolpropane pentaacrylate, ditrimethylolpropane hexaacrylate, pentaerythritol triacrylate, pentaerythritol tetraacrylate, glycerol diacrylate, glycerol triacrylate, diacrylates of sugar alcohols, sorbitol, mannitol, diglycerol, threitol, erythritol, adonitol (ribitol), arabitol (lyxitol), xylitol, dulcitol (galactitol), maltitol, isomalt, polyester polyols, polyetherols, polyTHF having a molar mass of between 162 and 2000, poly-1,3-propanediol having a molar mass of between 134 and 1178, or polyethylene glycol having a molar mass of between 106 and 898, polyacrylates of sugar alcohols, sorbitol, mannitol, diglycerol, threitol, erythritol, adonitol (ribitol), arabitol (lyxitol), xylitol, dulcitol (galactitol), maltitol, isomalt, polyester polyols, polyetherols, polyTHF having a molar mass of between 162 and 2000, poly-1,3-propanediol having a molar mass of between 134 and 1178, or polyethylene glycol having a molar mass of between 106 and 898, urethane acrylates and polycarbonate acrylates.

4. The coating composition according to claim 2, wherein compounds (II) and (VI) are aromatic aldehdyes.

5. The coating composition according to claim 1, wherein compound (S) comprises at least one compound (Sz) obtainable by reaction of at least one difunctional carbonyl compound (A2) and/or at least one more-than-difunctional carbonyl compound (Ax) with at least one difunctional acrylate compound (B2) and/or at least one more-than-difunctional acrylate compound (By).

6. The coating composition according to claim 5, wherein compound (S) comprises at least one compound (Sz) obtainable by reaction of at least one difunctional carbonyl compound (A2) with at least one difunctional acrylate compound (B2).

7. The coating composition according to claim 5, wherein compound (A2) is selected from the group consisting of glyoxal, malonaldehyde, succinaldehyde, glutaraldehyde, capronaldehyde, furan-2,5-dialdehyde, pyrrole-2,5-dialdehyde, pyridine-2,6-dialdehyde, phthalaldehyde, isophthalaldehyde, and terephthalaldehyde.

8. The coating composition according to claim 5, wherein compound (B2) is selected from the group consisting of ethylene glycol diacrylate, 1,2-propanediol diacrylate, 1,3-propanediol diacrylate, 1,4-butanediol diacrylate, and 1,6-hexanediol diacrylate.

9. The coating composition according to claim 5, wherein compound (By) is selected from the group consisting of trimethylolpropane triacrylate, pentaerythritol triacrylate, pentaerythritol tetraacrylate, triacrylate of singly to vigintuply ethoxylated trimethylolpropane, and tetraacrylate of singly to vigintuply ethoxylated pentaerythritol.

10. The coating composition according to claim 1, wherein the compounds (C) are compounds (C1) of the formula

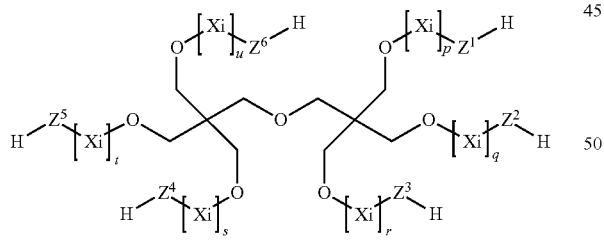

or compounds (C2) of the formula

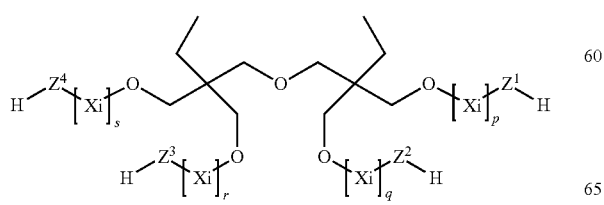

or compounds (C3) of the formula

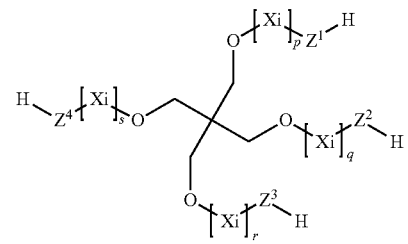

in which
$Z^1$, $Z^2$, $Z^3$, $Z^4$, $Z^5$, and $Z^6$ are each independently of one another a single bond or a radical of the formula —(C=O)—$R^3$—S—,
$R^3$ is a divalent $C_1$- to $C_6$-alkylene radical,
p, q, r, s, t, and u, in each case independently of one another, are zero or a positive integer from 1 to 5,
each $X_i$ for i=1 to p, 1 to q, 1 to r, 1 to s, 1 to t, and 1 to u, independently of one another, is selected from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O—, and —CHPh-$CH_2$—O—, in which Ph is phenyl and Vin is vinyl,
with the proviso that in the case of the compounds (C1) at least four of the radicals $Z^1$ to $Z^6$ are a group of the formula —(C=O)—$R^3$—S— and, in the case of the compounds (C2) and (C3), at least three radicals $Z^1$ to $Z^4$ are a group of the formula —(C=O)—$R^3$—S—.

11. The coating composition according to claim 1, wherein the compounds (C) are compounds (C4) with a functionality of two or three, of the formula

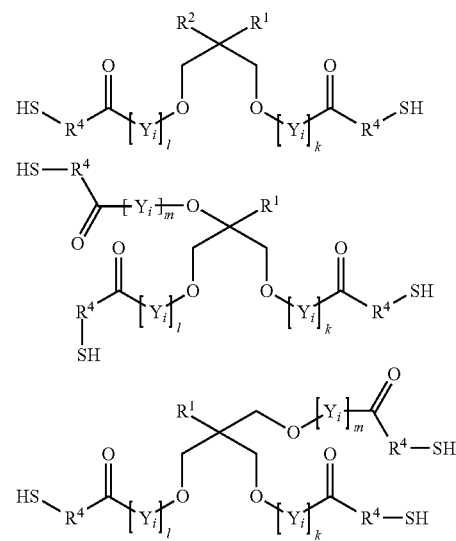

in which
$R^1$ and $R^2$, each independently of one another, are hydrogen or a $C_1$- to $C_4$-alkyl radical, $R^4$ is methylene or 1,2-ethylene,
k, l, m, and n, in each case independently of one another, are zero or a positive integer from 1 to 5, each $Y_i$ for i=1 to k, 1 to 1, 1 to m, and 1 to n, independently of one another, is selected from the group consisting of —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O—, and —CHPh-CH$_2$—O—, in which Ph is phenyl and Vin is vinyl.

12. The coating composition according to claim 1, wherein compound (C) is selected from the group consisting of ethylene glycol di(3-mercaptopropionate) (GDMP), trimethylolpropane tri(3-mercaptopropionate) (TMPMP), trimethylolpropane trimercaptoacetate (TMPMA), 3-mercaptopropionic ester of poly-1,2-propylene glycol with a molar mass of 500 to 2500 g/mol, 3-mercaptopropionic ester of ethoxylated trimethylolpropane with a molar mass of up to 1500 g/mol, pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and their alkoxylated, ethoxylated and/or propoxylated products.

13. The coating composition according to claim 1, wherein the catalyst (E) is selected from the group consisting of primary amines, secondary amines, and tertiary amines, primary phosphines, secondary phosphines, and tertiary phosphines, quaternary ammonium salts, phosphonium salts, imines, and iminium salts.

14. A process for utilizing the coating composition according to claim 1 as an adhesive.

15. A method comprising curing the coating composition according to claim 1, wherein the ambient temperature is not more than 5° C.

* * * * *